(12) United States Patent
Benavides et al.

(10) Patent No.: US 7,070,273 B2
(45) Date of Patent: *Jul. 4, 2006

(54) EYEGLASSES FRAME WITH ROTATABLE TEMPLES

(75) Inventors: Nestor M. Benavides, Gaithersburg, MD (US); Matthew Laine, Severna Park, MD (US); Brian E. Le Gette, Baltimore, MD (US); Russell Reed, Park City, UT (US); David B. Staley, Park City, UT (US); Alan Tipp, Baltimore, MD (US); Justin S. Werner, Millersville, MD (US); Ronald L. Wilson, II, Catonsville, MD (US)

(73) Assignee: 180s, Inc., Baltimore, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/987,308

(22) Filed: Nov. 15, 2004

(65) Prior Publication Data
US 2005/0146675 A1    Jul. 7, 2005

Related U.S. Application Data

(63) Continuation of application No. 09/943,064, filed on Aug. 31, 2001, now Pat. No. 6,817,710.

(51) Int. Cl.
*G02C 5/08* (2006.01)
(52) U.S. Cl. .................. 351/115; 351/63; 351/153; 16/228
(58) Field of Classification Search ............. 351/63, 351/41, 140, 153, 115, 111; 2/454; 16/228
See application file for complete search history.

(56) References Cited

U.S. PATENT DOCUMENTS

| 2,031,771 A | 2/1936 | Grier |
| 3,049,974 A | 8/1962 | Miwa |
| 3,361,515 A | 1/1968 | Vanderbeek |
| 3,476,466 A | 11/1969 | Hopkins |
| 3,533,687 A | 10/1970 | Herzig |
| 4,050,785 A | 9/1977 | Auge |
| 4,662,729 A | 5/1987 | Dobson |
| 4,820,035 A | 4/1989 | Kanda |
| 4,848,861 A | 7/1989 | McCulley |

(Continued)

FOREIGN PATENT DOCUMENTS

AU    B-48042/79    5/1983

(Continued)

OTHER PUBLICATIONS

Photographs of sunglasses (Briko models Zen, Shot.2, Radar, and Echoes) publicly available from Briko USA, West Lebanon, New Hampshire prior to Aug. 31, 2000 (pp. 1-29).

(Continued)

*Primary Examiner*—Hung Xuan Dang
(74) *Attorney, Agent, or Firm*—Cooley Godward LLP

(57) ABSTRACT

Eyeglasses comprises a face and temple. The face has an outer surface including an outer edge. The face also has a first end portion and a first lens opening. The outer edge being proximate to the first end portion. The temple has a portion defining an inner surface. The temple is pivotably coupled to the first end portion of the face. The temple is movable between a folded configuration and an unfolded configuration so that the inner surface of the temple portion can move over the outer edge of the face without obstruction.

17 Claims, 32 Drawing Sheets

U.S. PATENT DOCUMENTS

| | | |
|---|---|---|
| 5,137,342 A | 8/1992 | Jannard et al. |
| 5,187,504 A | 2/1993 | Kanda |
| 5,448,317 A | 9/1995 | Huang |
| 5,610,669 A | 3/1997 | Kuipers et al. |
| 5,638,146 A | 6/1997 | Nannini |
| 5,638,147 A | 6/1997 | Wang-Lee |
| 5,764,330 A | 6/1998 | Simioni |
| 5,896,186 A | 4/1999 | Roban |
| 5,980,036 A | 11/1999 | Solomon |
| 5,984,471 A | 11/1999 | Tredoulat |
| 6,000,795 A | 12/1999 | Van Rysselberghe |
| 6,048,062 A | 4/2000 | Chow |
| 6,068,375 A | 5/2000 | LeBrun et al. |
| D437,339 S | 2/2001 | Tsou |
| 6,257,720 B1 | 7/2001 | Ozawa |
| 6,375,323 B1 | 4/2002 | Yang |
| 6,817,710 B1 * | 11/2004 | Benavides et al. .......... 351/115 |

FOREIGN PATENT DOCUMENTS

| | | |
|---|---|---|
| EP | 0311379 A2 | 10/1988 |
| EP | 1008888 A1 | 6/2000 |
| GB | 458990 | 12/1936 |
| GB | 1372417 | 10/1974 |
| JP | 2001-4961 | 1/2001 |
| WO | WO 00-22475 | 4/2000 |

OTHER PUBLICATIONS

Brochure of sunglasses by Minima® Sport.

* cited by examiner

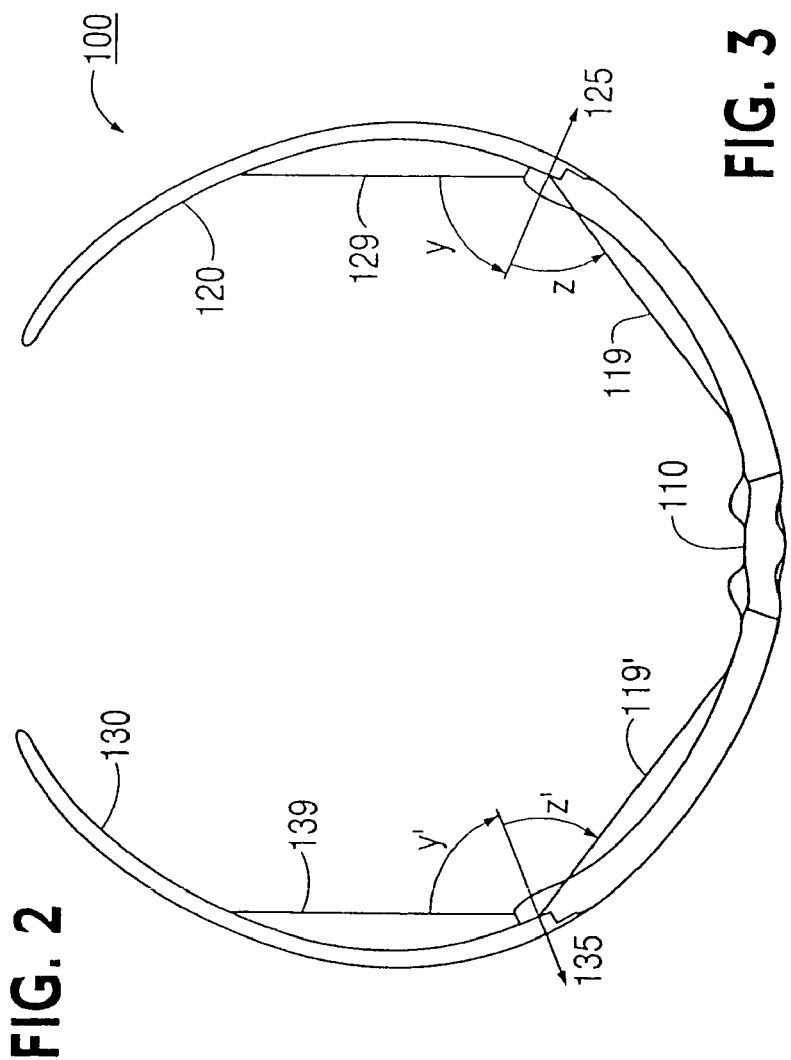
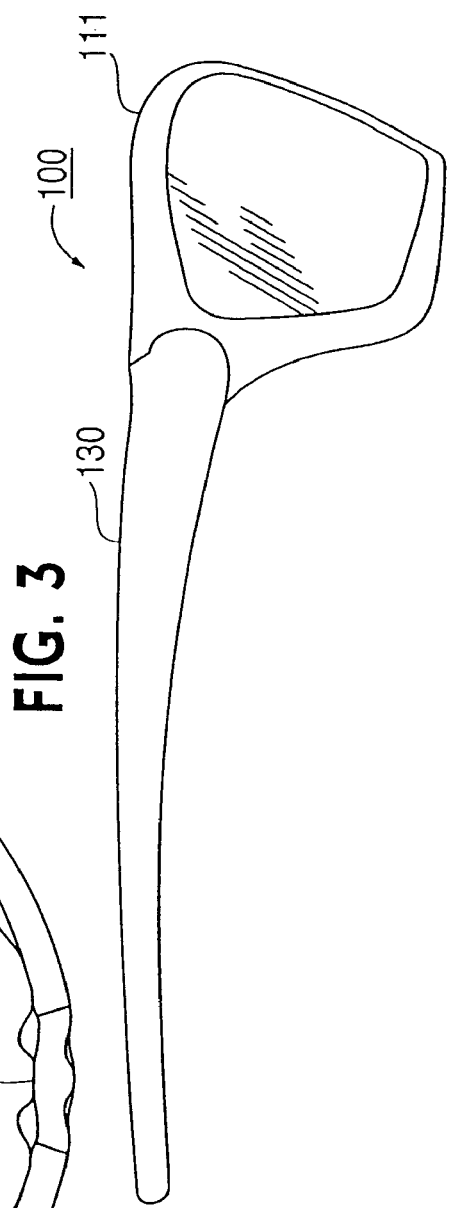
FIG. 2
FIG. 3

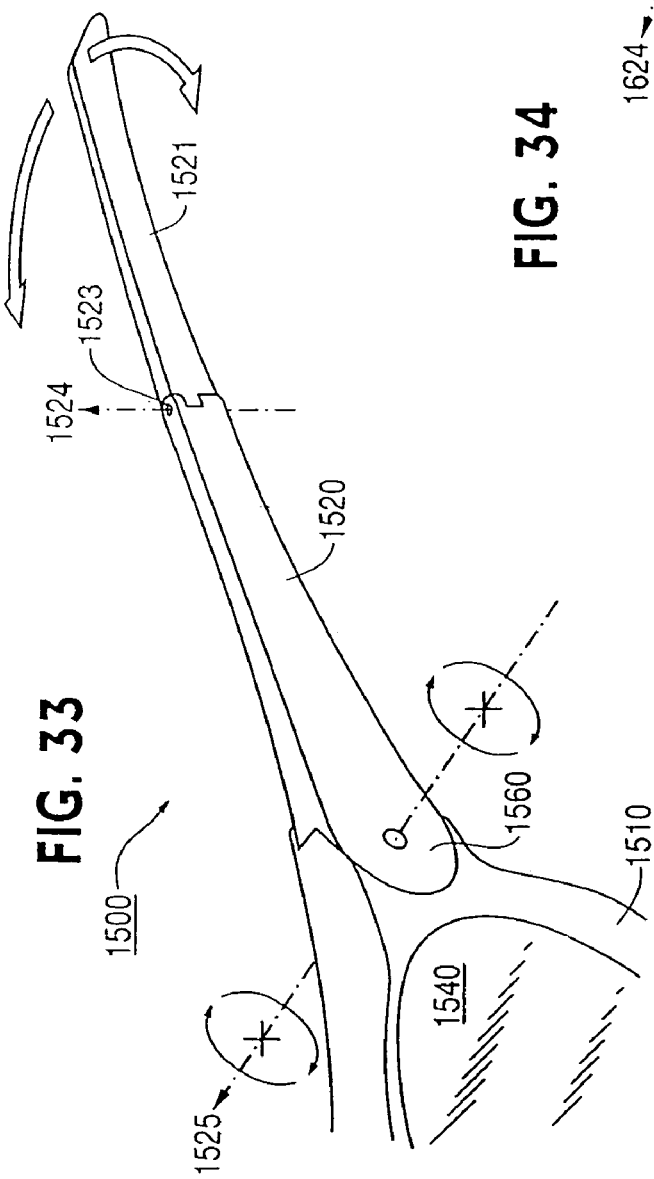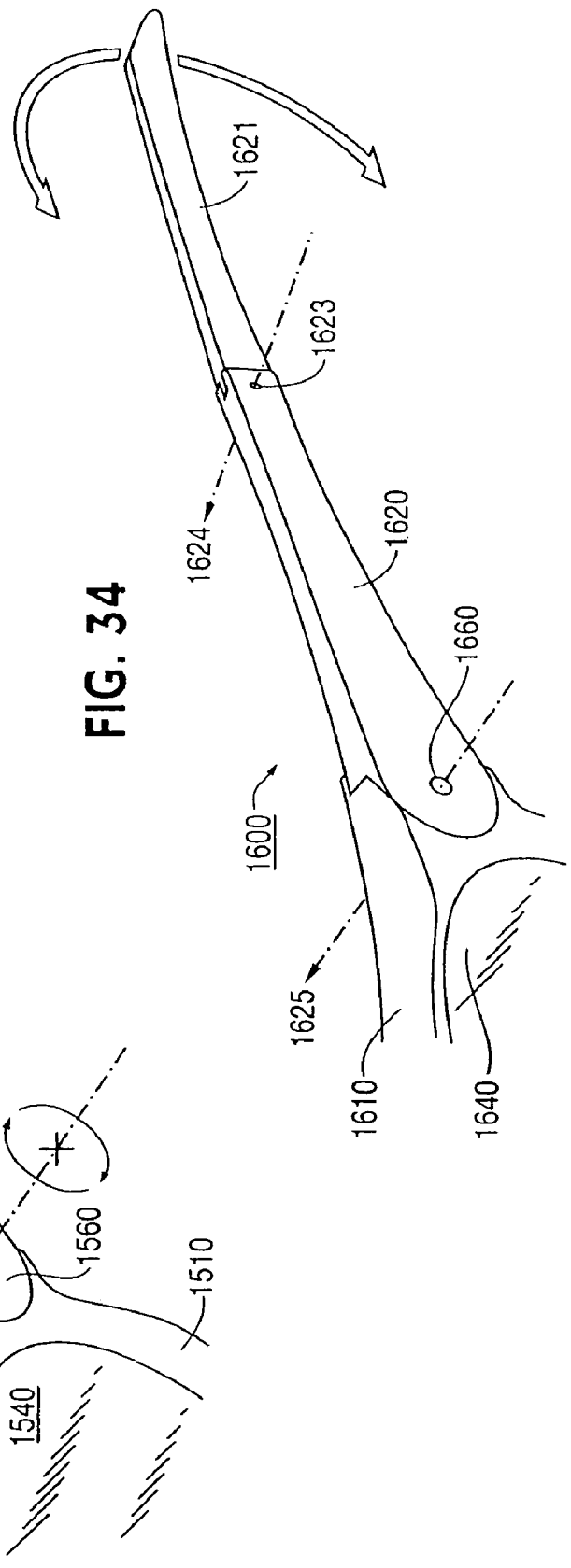

EYEGLASSES FRAME WITH ROTATABLE TEMPLES

CROSS-REFERENCE TO RELATED APPLICATIONS

This application claims priority to and is a continuation application of U.S. patent application Ser. No. 09/943,064, entitled "Eyeglasses Frame with Rotatable Temples" filed Aug. 31, 2001 now U.S. Pat. No. 6,817,710, the entirety of which is incorporated herein by reference. This application is related to concurrently filed U.S. Design Patent Application entitled "Eyeglasses Frame with Front-Folding Overlapping Temples," Ser. No. 29/817,710, and is related to concurrently filed U.S. Design Patent Application entitled "Eyeglasses Frame with Front-Folding Parallel Temples," Ser, No. 29/147,528, and is related to concurrently filed U.S. Design Patent Application entitled "Eyeglasses Frame with Front-Folding Crossing Temples," Ser. No. 29/147,530; the disclosures of which are all incorporated herein by reference.

BACKGROUND OF THE INVENTION

The invention relates generally to eyeglasses, such as for example sunglasses. More specifically, the invention relates to eyeglasses with rotatable temples where the temples can rotate to the front of the lens(es).

The lenses of eyeglasses typically need to be protected from abrasion, for example, to maintain an unobstructed view through the lenses for the user. Protection from abrasion can be particularly desirable for lenses that are coated, for example, with polarization-selective coatings. Such forms of protection include, for example, storage cases and anti-scratch lens coatings.

Such forms of protection, however, have limited effectiveness. For example, storage case can only protect eyeglasses from abrasion when the lenses are stored within the case. This cannot protect the lenses from abrasion when the eyeglasses are, for example, temporarily placed down on a surface. Similarly, anti-scratch lens coatings provide limited protection in such situations.

Eyeglass designs have been proposed in which the temples can be moved to the front of the eyeglasses frame. For example, U.S. Pat. No. 5,638,146 to Nannini discloses collapsible eyewear having temples that collapse in the same plane as the lenses. The Nannini eyewear uses two hinges for each temple where one hinge allows the temple to rotate 360°. The temples collapse to reduce the storage space needed when the eyewear is folded.

U.S. Pat. No. 3,361,515 to Vanderbeek discloses eyewear having temple pieces that are oppositely folding: one temple folds to the front of the eyeglasses and the other temple folds to the rear of the eyeglasses. The hinge of Vanderbeek allows the temples to pivot 270° so that the temple when folded is parallel to its location when unfolded. Correspondingly, the single temple folded to the front of the eyeglasses is parallel to the upper bar of the eyeglasses so that the lenses are only minimally shielded by the temple.

These known eyeglass designs suffer several shortcomings. They are typically designed to minimize the amount of space needed during storage, but provide little to no shielding of the front side of both lenses. Many of these known eyeglass designs require two hinges for each temple. In addition, they cannot position the temples adjacent to the center portion of the outer side (or front side) of the lens. The center portion of the lens is the portion that the user is most likely to look through and, because of the curvature of typical lenses, the portion of the lens most likely in need of protection from abrasion.

Thus, a need exists for eyeglasses with rotatable temples where the temples can rotate to the outer side (or front side) of the eyeglasses face.

SUMMARY OF THE INVENTION

Eyeglasses comprises a face and temple. The face has an outer surface including an outer edge. The face also has a first end portion and a first lens opening. The outer edge being proximate to the first end portion. The temple has a portion defining an inner surface. The temple is pivotably coupled to the first end portion of the face. The temple is movable between a folded configuration and an unfolded configuration so that the inner surface of the temple portion can move over the outer edge of the face without obstruction.

BRIEF DESCRIPTION OF THE DRAWINGS

FIG. 2 shows a top view of the eyeglasses shown in FIG. 1.

FIG. 3 shows a side view of the eyeglasses shown in FIG. 1

FIG. 33 shows a perspective view of a portion of eyeglasses having a dual hinge, according to an embodiment of the invention.

FIG. 34 shows a perspective view of a portion of eyeglasses having a dual hinge, according to another embodiment of the invention.

DETAILED DESCRIPTION

Embodiments of the invention relate to eyeglasses having rotatable temples, where the temples can rotate to the outer side (i.e., the front side) of the eyeglasses face. The eyeglasses face is the portion of the frame which provides structure for the eyeglasses and to which the temples are typically attached. The face can be, for example, the structure within which one or more lenses can be retained. Alternatively, the face can be, for example, a single lens configured like a shield; in such an embodiment, the temples can be attached directly to the lens/face. In another alternative, the face can be, for example, two lenses connected by a nosepiece; in this embodiment, the temples can each be attached directly to a respective lens.

The inventors have recognized that the lenses can be protected from abrasion by configuring the eyeglasses so that the temples, when rotated to the outer side of the eyeglasses face (in a folded configuration), can be positioned substantially adjacent to the outer side of the lenses and substantially at the center portions of the lenses. Thus, many embodiments, for example, relate to eyeglasses where, in a folded configuration, at least one temple can be positioned substantially adjacent to the outer side of at least one lens and substantially at the center portion of the lens(es). Other embodiments relate to the temples and eyeglasses face having their own degree of curvature that substantially correspond. For example, in such embodiments, the temples and face can form a circular-type shape from a top view.

Other embodiments relate to hinge mechanisms by which a temple can be pivotably coupled to the face. For example, in one embodiment, the hinge includes a tension member that allows the temple to contact one portion of the eyeglasses face when in a folded configuration and a different contact portion of the eyeglasses face when in an unfolded configuration.

Figure 1:
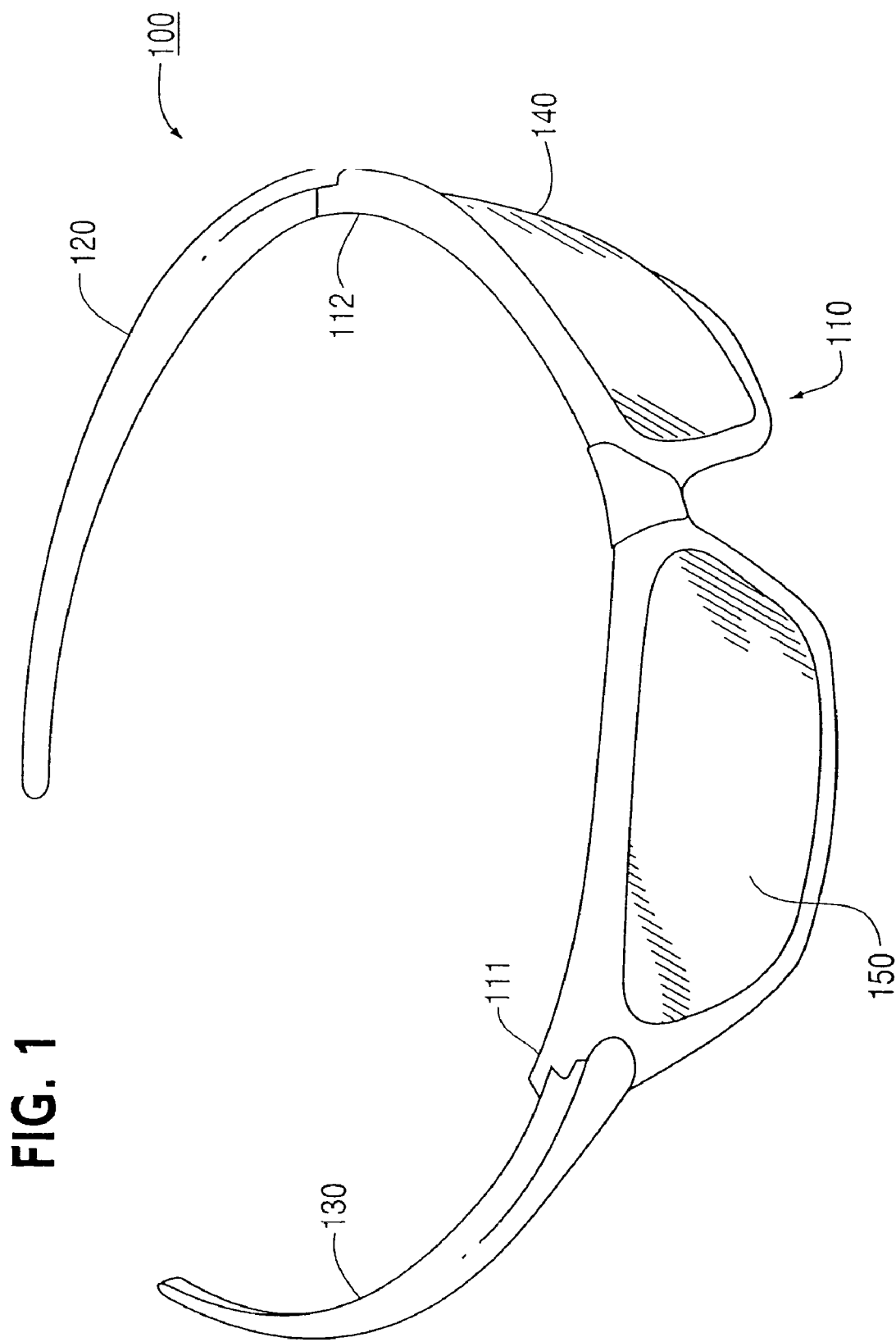
FIG. 1 illustrates a perspective view of eyeglasses in an unfolded configuration, according to an embodiment of the invention.

FIG. 1 illustrates a perspective view of eyeglasses according to an embodiment of the invention. Eyeglasses 100 include face 110, temple 120, temple 130, lens 140 and lens 150. Thus, the eyeglasses frame includes face 110, temple 120 and temple 130. As shown in FIG. 1, eyeglasses 100 are in an unfolded configuration in which they can be worn by a user. Face 110 includes end portions 111 and 112. Temple 130 is pivotably coupled to end portion 111 of face 110 and temple 120 is pivotably coupled to end portion 112 of face 110. Therefore, the temples 120 and 130 are movable and can pivot along pivot axes 125 and 135, respectively, to the outer side of frame 110. The pivot connection will be described in further detail below.

Figure 4:
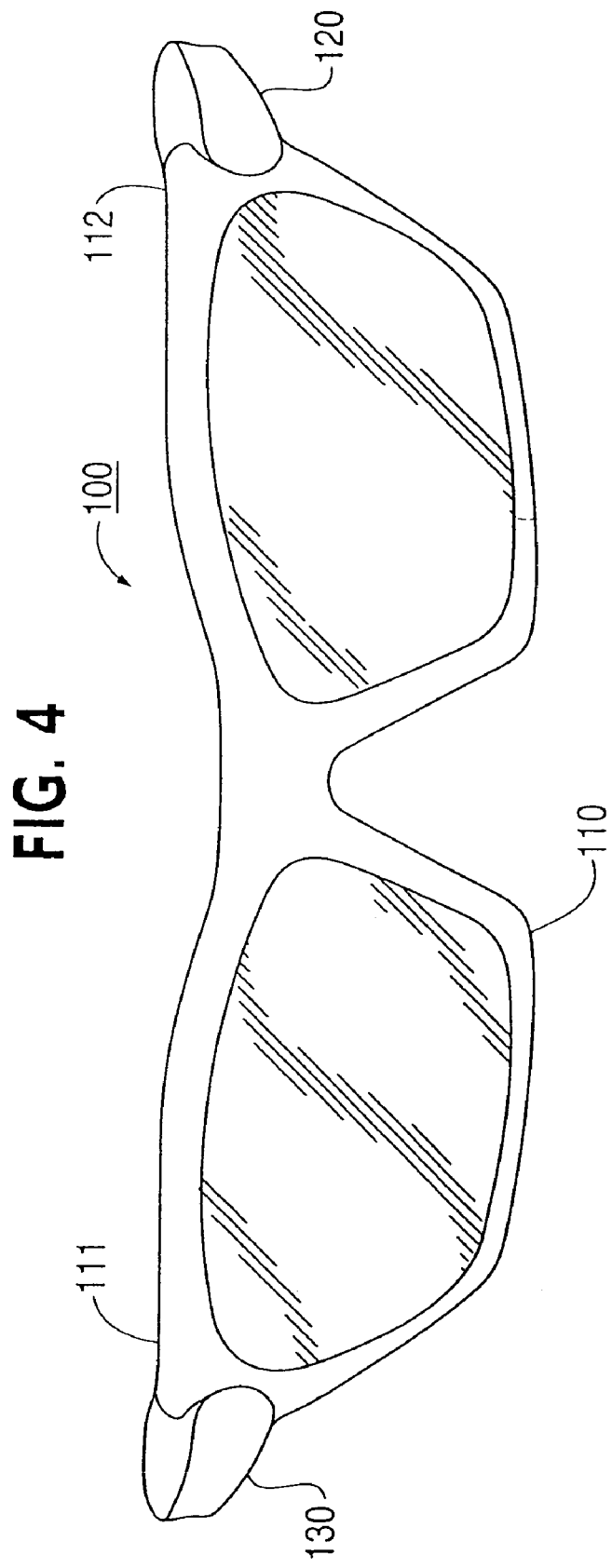
FIG. 4 shows a front view of the eyeglasses shown in FIG. 1.

FIGS. 2 through 4 show a top view, a side view and a front view, respectively, of eyeglasses 100. Face 110 and temples 120 and 130 each have their own degree of curvature. The term degree of curvature is used herein to indicate the extent to which an arcuate member (or portion thereof) such as face 110 and temples 120 and 130 are curved. For example, as shown in FIG. 2, face 110 and temples 120 and 130 form a continuous, near-circle shape. In such a case the degree of curvature would be related to the radius of curvature for each of those members from the top view. Alternatively the degree of curvature could relate to the relative extent to which members are curved when they do not have a uniform radius of curvature throughout the entire member.

Temples 120 and 130 can be pivotably rotated around the end portions 111 and 112 of face 110 so that temples 120 and 130 are positioned on the outer side of face 110. By allowing temples 120 and 130 to be positioned on the outer side of face 110 and adjacent to lenses 140 and 150, temples 120 and 130 can act to protect lenses 140 and 150 (for example from eyeglasses 100 being placed or dropped face down on a surface). In other words, by positioning temples 120 and 130 over the lenses 140 and 150, the lenses 140 and 150 can be protected from scratches or damage because the lenses cannot contact, for example, a substantially flat surface against which the eyeglasses may be placed. Furthermore, by allowing temples 120 and 130 to be positioned on the outer side of face 110 and adjacent to lenses 140 and 150, the eyeglasses can reduce the amount volume needed, for example, while being stored and not in use in a folded configuration.

As shown in FIG. 2, the angle, y, is defined between the pivot axis 125 and a segment line 129 from the pivot axis 125 to a point of temple 120. The angle, z, is defined between the pivot axis 125 and a segment line 119 from the pivot axis 125 to a point of face 110, where the length of segment line 129 is substantially equal to the length of segment line 119. Similarly, the angle, y', is defined between the pivot axis 135 and a segment line 139 from the pivot axis 125 to a point of temple 130. The angle, z', is defined between the pivot axis 135 and a segment line 119' from the pivot axis 125 to a point of face 110, where the length of segment line 139 is substantially equal to the length of segment line 119'.

In this embodiment, the angles, y, y', z and z' are substantially equal. Consequently, the extent to which a portion of a temple is curved substantially matches the similar portion of the face. Because the degree of curvature of the temples 120 and 130 are substantially equal to the degree of curvature of the face 110, the temples 120 and 130 are substantially adjacent to the outer side of face 110 when in a folded configuration. In alternative embodiments, the degree of curvature of the temples and face are not substantially equal while the angles, y, y', z and z' can be substantially equal. In yet other alternative embodiments, the angles, y, y', z and z' need not be substantially equal where the temples can be deformed to be disposed on the outer side of the face.

Figure 5:
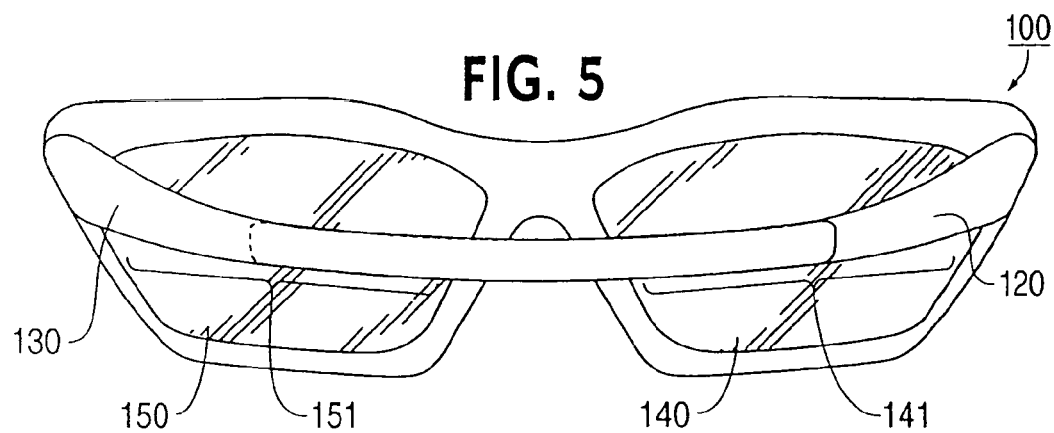
FIGS. 5 through 8 show a front view, a top view, a side view and a perspective view, respectively, of the eyeglasses shown in FIG. 1 in a folded configuration.
Figure 6:
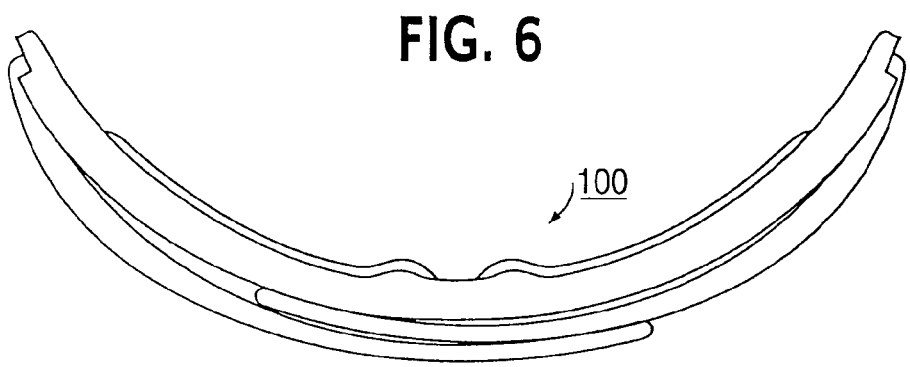
Figure 7:
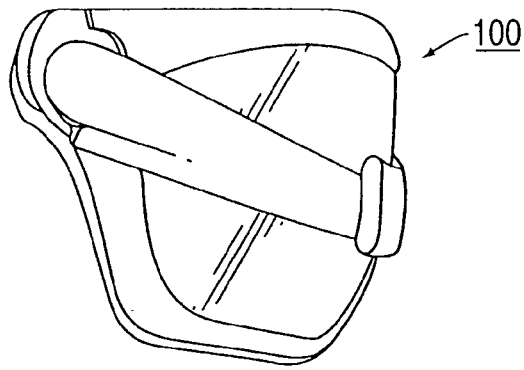
Figure 8:
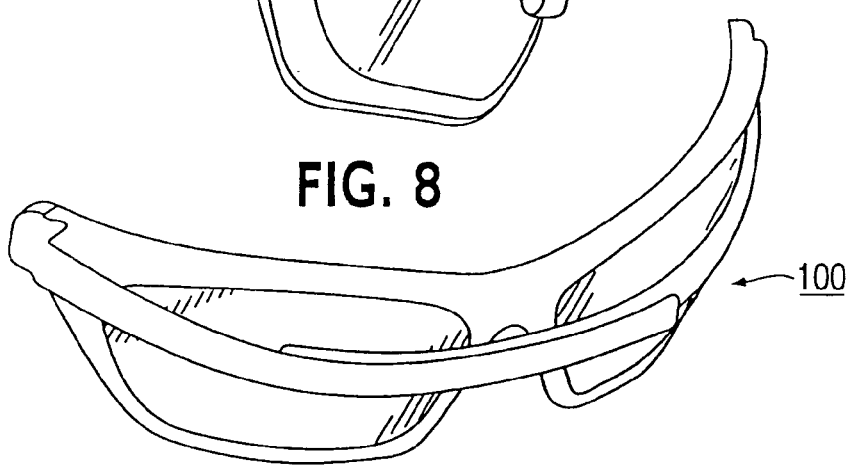

FIGS. 5 through 8 show a front view, a top view, a side view and a perspective view, respectively, of eyeglasses 100 in a folded configuration. As shown in FIG. 5, temples 120 and 130 can be positioned over a central region 141 and 151 of lenses 140 and 150, respectively. Temples 120 and 130 can be positioned so that one overlaps onto the other. For example, as shown in FIG. 5, temple 130 overlaps temple 120. In an alternative arrangement, temple 120 can overlap temple 130.

The temples can be arranged in different configurations while the eyeglasses are in a folded configuration. For example, FIGS. 9 through 12 show one such alternative temple configuration and FIGS. 13 through 16 show another alternative temple configuration.

FIGS. 9 through 12 show a front view, a top view, a side view and a perspective view, respectively, of eyeglasses in a folded configuration, according to another embodiment of the invention.

Figure 9:
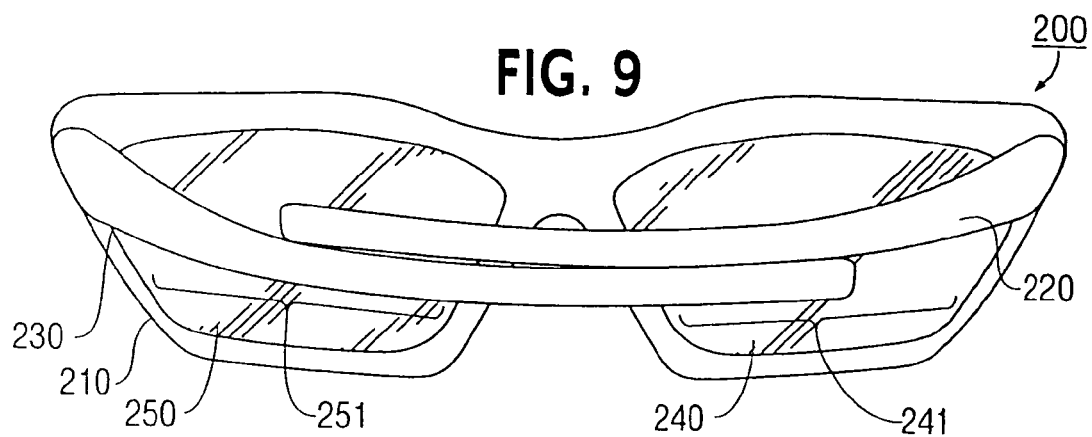
FIGS. 9 through 12 show a front view, a top view, a side view and a perspective view, respectively, of eyeglasses in a folded configuration, according to another embodiment of the invention.
Figure 10:
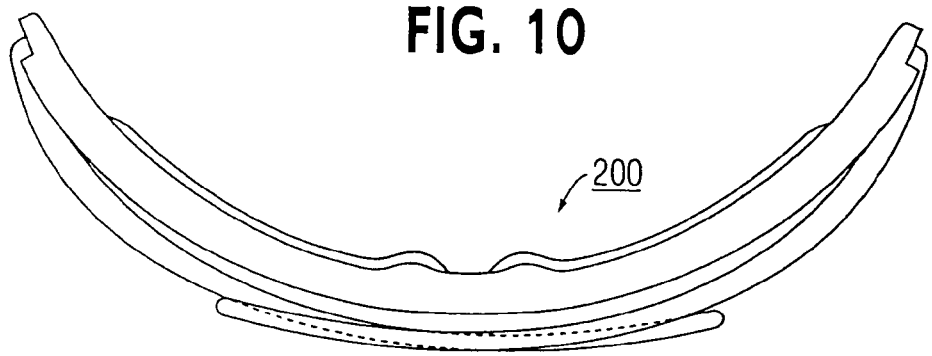
Figure 11:
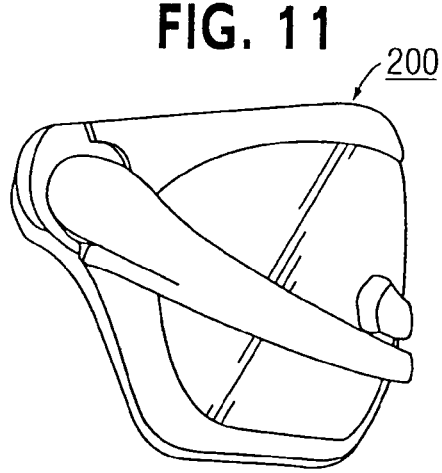
Figure 12:
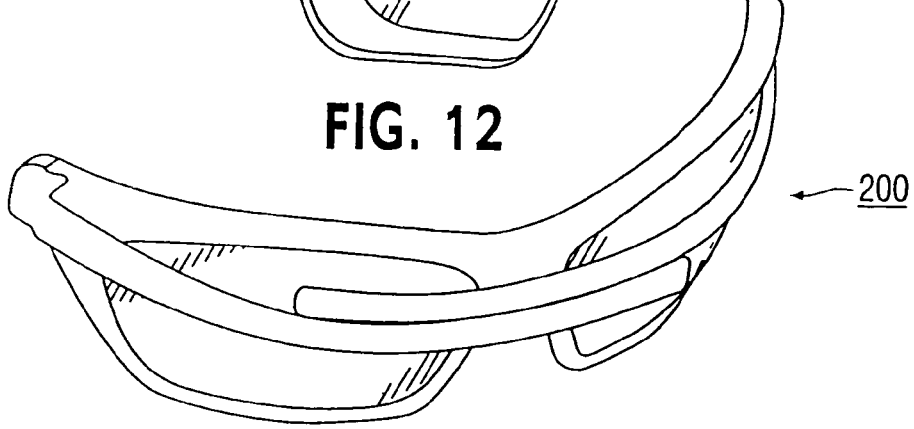

Eyeglasses 200 include temple 220, temple 230, face 210, lens 240 and lens 250. While face 200 is in a folded configuration as shown in FIG. 9, the temples 220 and 230 can be positioned so that temples 220 and 230 are substantially parallel to each other and across lenses 240 and 250. Although FIG. 9 shows temple 220 positioned above temple 230, the temples can be arranged differently so that temple 230 is positioned above temple 220.

As shown in FIG. 9, temple 220 can be positioned over central region 241 of lens 240 in addition to being positioned over a portion of central region 251 of lens 250. Similarly, temple 230 can be positioned over central region 251 of lens 250 while also being positioned over a portion of central region 241 of lens 240.

Figure 13:
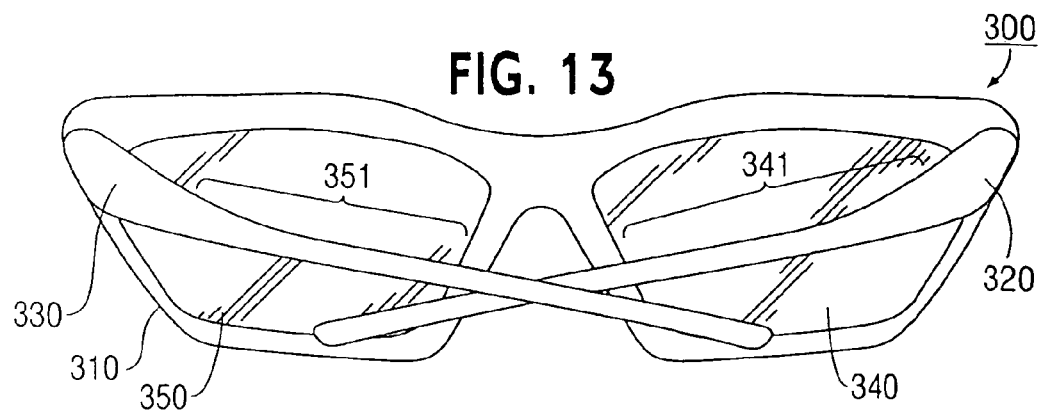
FIGS. 13 through 16 shows a front view, a top view, a side view and a perspective view, respectively, of eyeglasses in a folded configuration, according to yet another embodiment of the invention.
Figure 14:
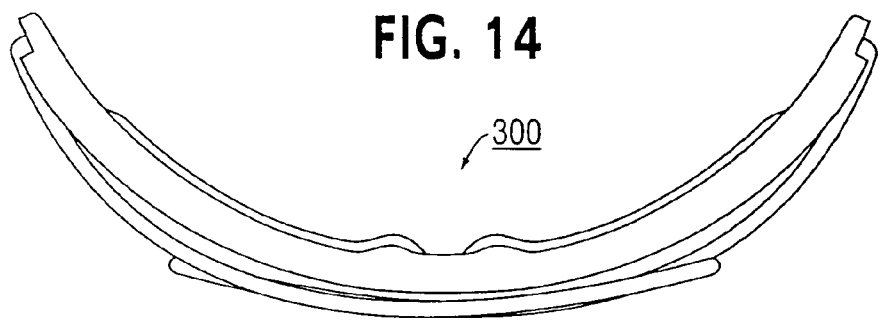
Figure 15:
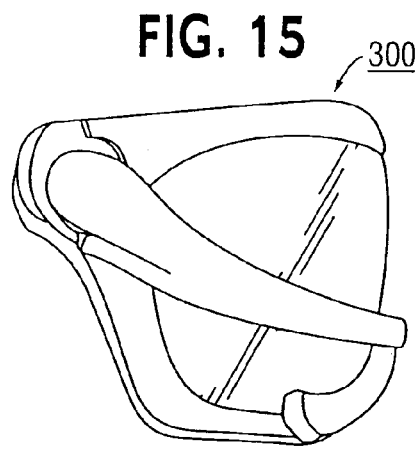
Figure 16:
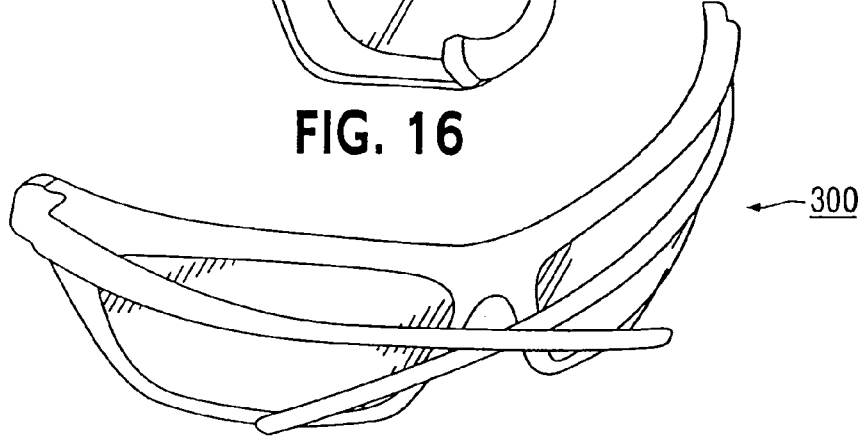

FIG. 13 shows a front view of eyeglasses in a folded configuration, according to yet another embodiment of the invention. FIG. 14 shows a top view of the eyeglasses shown in FIG. 13. FIG. 15 shows a side view of the eyeglasses shown in FIG. 13. FIG. 16 shows a perspective view of the eyeglasses shown in FIG. 13.

As shown in FIG. 13, eyeglasses 300 include face 310, temple 320, temple 330, lens 340 and lens 350. Temple 320 and temple 330 can be positioned so that they cross each other on the outer side of the face 310. More specifically, temple 320 can be positioned adjacent to lens 340 and center region 341 of lens 340 while also being positioned over a portion of lens 350. Similarly, temple 330 can be positioned adjacent to lens 350 and central portion 351 of lens 350 while also being positioned over a portion of lens 340. As shown FIG. 13, temple 320 is positioned between face 310 and temple 330. Alternatively, temple 330 can be positioned between face 310 and temple 320.

Figure 17:
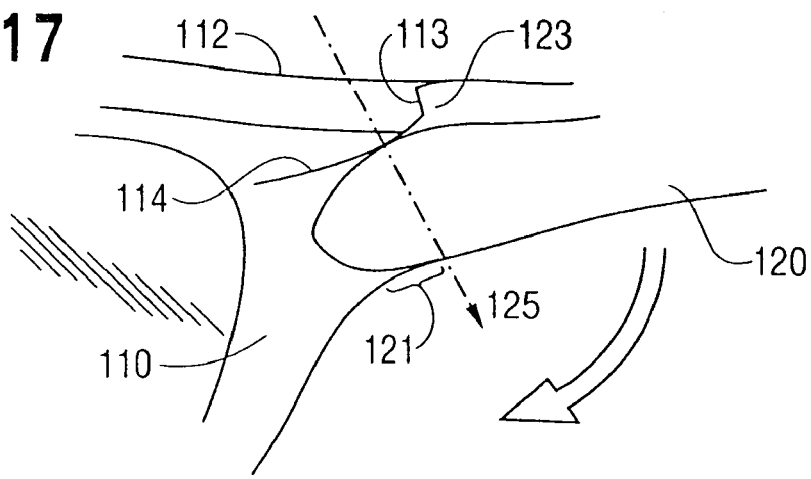
FIG. 17 shows a perspective view of a portion of the eyeglasses shown in FIG. 1.

FIG. 17 shows a perspective view of a portion of the eyeglasses shown in FIG. 1. More specifically, FIG. 17 shows the end portion 112 of face 110 to which temple 120 is pivotably coupled. As shown by the directional arrow in FIG. 17, the temple 120 can rotate downwardly towards the outer side of face 110 to change eyeglasses 100 from an unfolded configuration to a folded configuration. Pivot axis 125 shows the axis about which temple 120 pivots as it moves from a folded configuration to an unfolded configuration or vice-versa. Although not shown by FIG. 17, eyeglasses 100 can be converted back from a folded configuration to an unfolded configuration by positioning temple 120 back to the location shown in FIG. 17.

End portion 112 of face 110 includes rotation-limit portions 113 and 114 of face 110. As shown in FIG. 17, rotation-limit portion 113 is a ledge (or mechanical stop) on face 110 and rotation-limit portion 113 is a shoulder extending from the outer side of face 110. Rotation-limit portion 113 defines the uppermost position that temple 120 can maintain while in an unfolded configuration. More specifically, temple 120 includes a portion 123 that comes into contact with rotation-limit portion 113 as temple 120 rotates about pivot axis 125.

Rotation-limit portion 114 defines the uppermost position that temple 120 can maintain while in a folded configuration (i.e., the position beyond which further motion is limited). More specifically, temple 120 includes a portion 121 that comes into contact with rotation-limit portion 114 as temple 120 rotates about pivot axis 125. As temple portion 120 moves from a folded configuration to an unfolded configuration, temple 120 can rotate, for example, approximately 170° from the position shown in FIG. 17 to the outer side of face 110 while changing from an unfolded configuration to a folded configuration.

Figure 18:
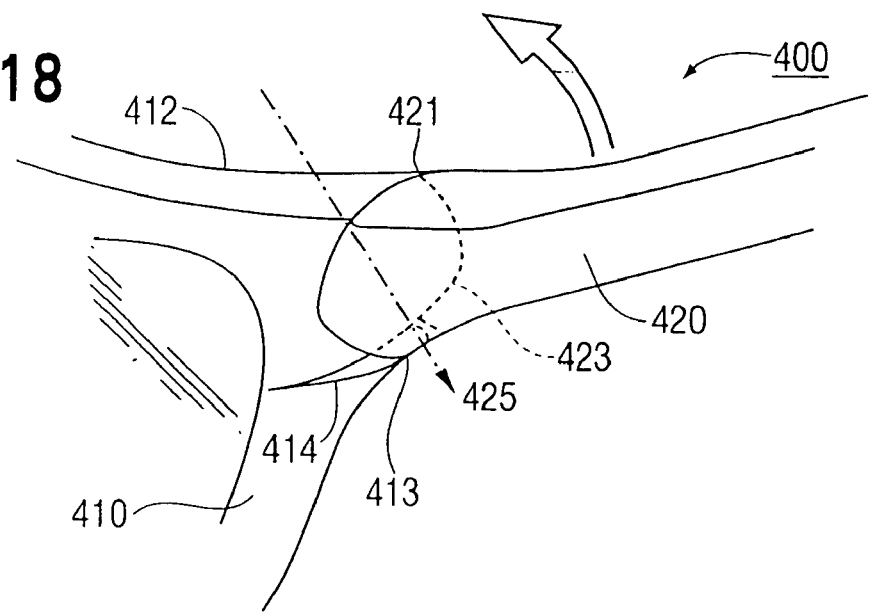
FIG. 18 shows a perspective view of a portion of eyeglasses, according to another embodiment of the invention.

FIG. 18 shows a perspective view of a portion of eyeglasses, according to another embodiment of the invention. Eyeglasses 400 includes face 410 and temple 440. Face 410 includes end portion 412. Temple 420 is pivotably coupled to face 410 about pivot axis 425. As shown in FIG. 18, temple 420 can rotate upwardly about pivot axis 425 to move the temple 420 from an unfolded configuration to a folded configuration. Face 410 includes rotation-limit portions 413 and 414. Rotation-limit portions 413 and 414 are a ledge on face 410 and a shoulder extending from the outer side of face 410, respectively, and thus, are basically a mirror image of the configuration shown in FIG. 17.

Rotation-limit portion 413 defines the lowermost position that temple 420 can maintain while in an unfolded configuration. More specifically, temple 420 includes a portion 423 that comes into contact with rotation-limit portion 413 as temple 420 rotates about pivot axis 425. Rotation-limit portion 414 defines the lowermost position that temple 420 can maintain while in a folded configuration. More specifically, temple 420 includes a portion 421 that comes into contact with rotation-limit portion 414 as temple 420 rotates about pivot axis 425.

Figure 19:
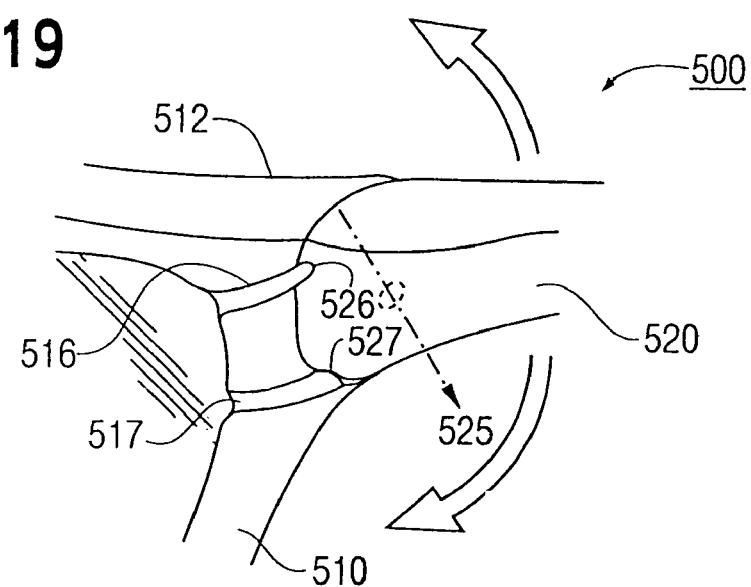
FIG. 19 shows a perspective view of a portion of eyeglasses according to another embodiment of the invention.

FIG. 19 shows a perspective view of a portion of eyeglasses according to another embodiment of the invention. As shown in FIG. 19, eyeglasses 500 include face 510 and temple 520. Face 510 includes end portion 512 to which temple 520 is pivotably coupled about pivot axis 525. End portion 512 of face 510 also includes retention portions 516 and 517 (shown as protrusions). Temple 520 includes retention portions 526 and 527 (shown as indentations), which complementary fit with retention portions 516 and 517, respectively. As temple 520 rotates either upwardly or downwardly, retention portions 516 and 517 allow the temple arm to temporarily lock (or snap) into a fixed location when temple 520 is an unfolded configuration. Although two retention portions 516 and 517 are shown in FIG. 19, in alternative embodiments, only a single retention portion (e.g., a single protrusion) and a single complementary retention portion (e.g., a single indentation) are included. Alternatively, almost any number of retention portions are possible. Note also although the retention portions shown in FIG. 19 are shown with a semicircular cross-section, alternative shapes are possible such as for example a rectangular or triangular retention portion (e.g., protrusion) cross-section and a complementary rectangular or triangular retention portion (e.g., indentation) cross-section. Note further that a retention portion set (two of which are shown in FIG. 19) can be combined with a rotation-limit portion (as shown in FIG. 17 and/or FIG. 18).

Figure 20:
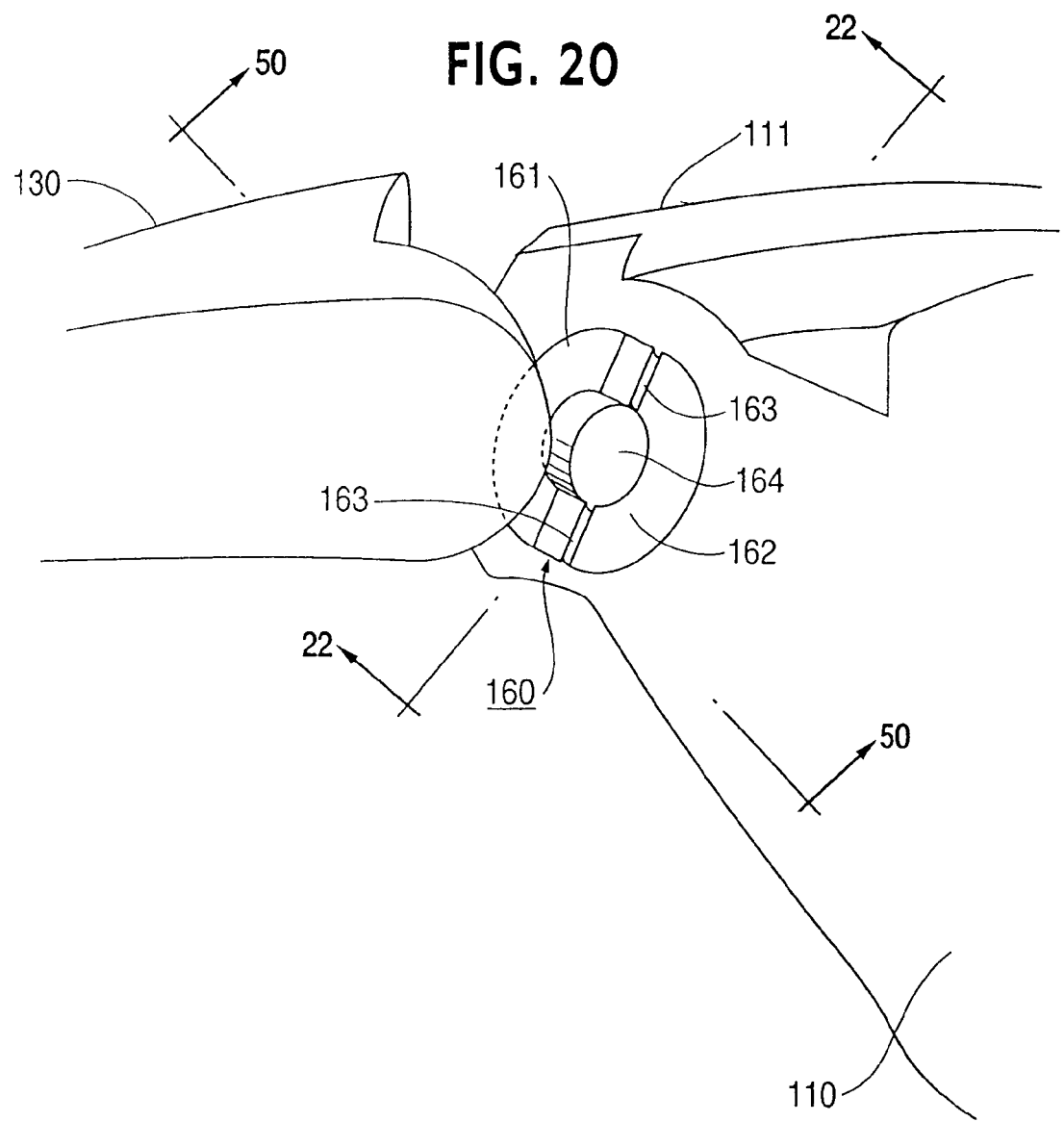
FIGS. 20 and 21 show exploded assembly views of hinge portions of the eyeglasses shown in FIG. 1.
Figure 21:
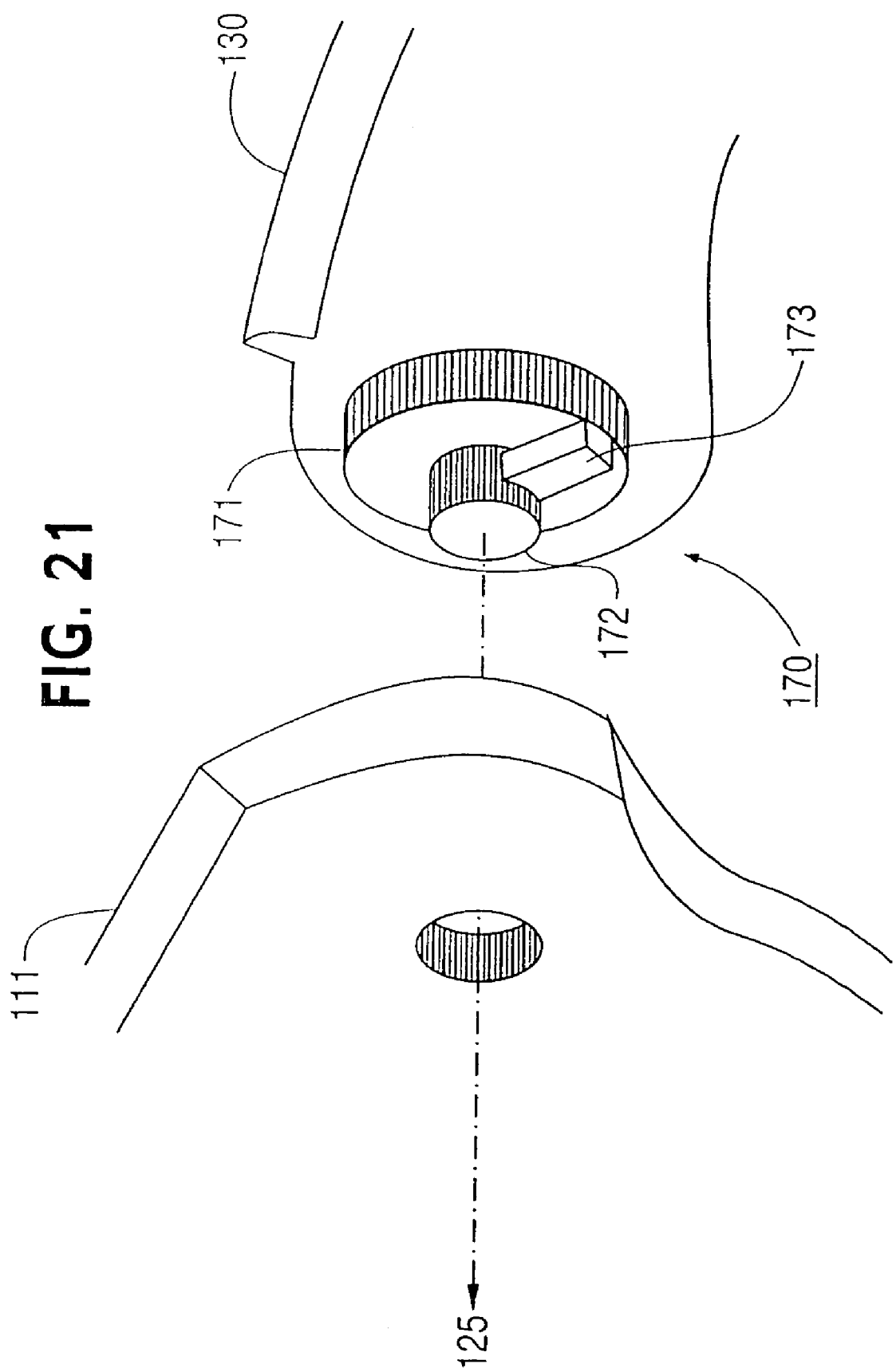

FIGS. 20 and 21 show assembly views of hinge portions of the eyeglasses shown in FIG. 1. As shown in FIG. 20, the end portion 111 of face 110 includes a hinge portion 160. Hinge portion 160 includes outer rotational-support portion (e.g., track) 161, inner rotational-support portion (e.g., track) 162, retention portions (e.g., indentations) 163 and central portion 164. As shown in FIG. 21, the temple 130 includes a hinge portion 170. Hinge portion 170 includes an outer post 171, an inner post 172 and an arm 173. Hinge portion 170 of temple 130 fits into hinge portion 160 of face 110 to define a pivot axis 125. Temple 130 can rotate about pivot axis 125 from an unfolded configuration to a folded configuration where the temple 130 is positioned adjacent to the outer side of face 110 (e.g., as shown in FIG. 5).

Figure 22:
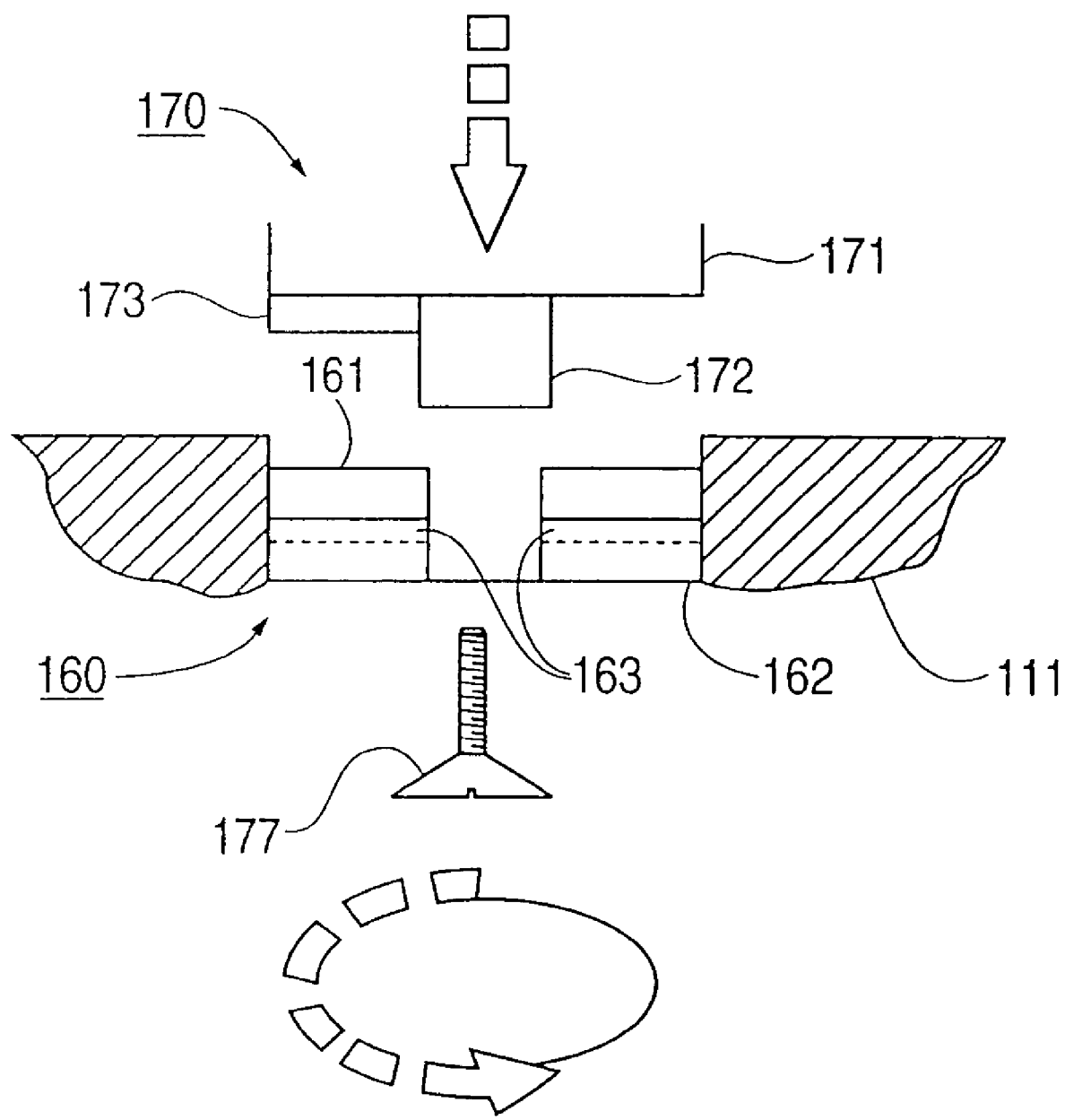
FIG. 22 shows a cross-section view of the hinge portions taken across line 22—22 in FIG. 20.
Figure 50:
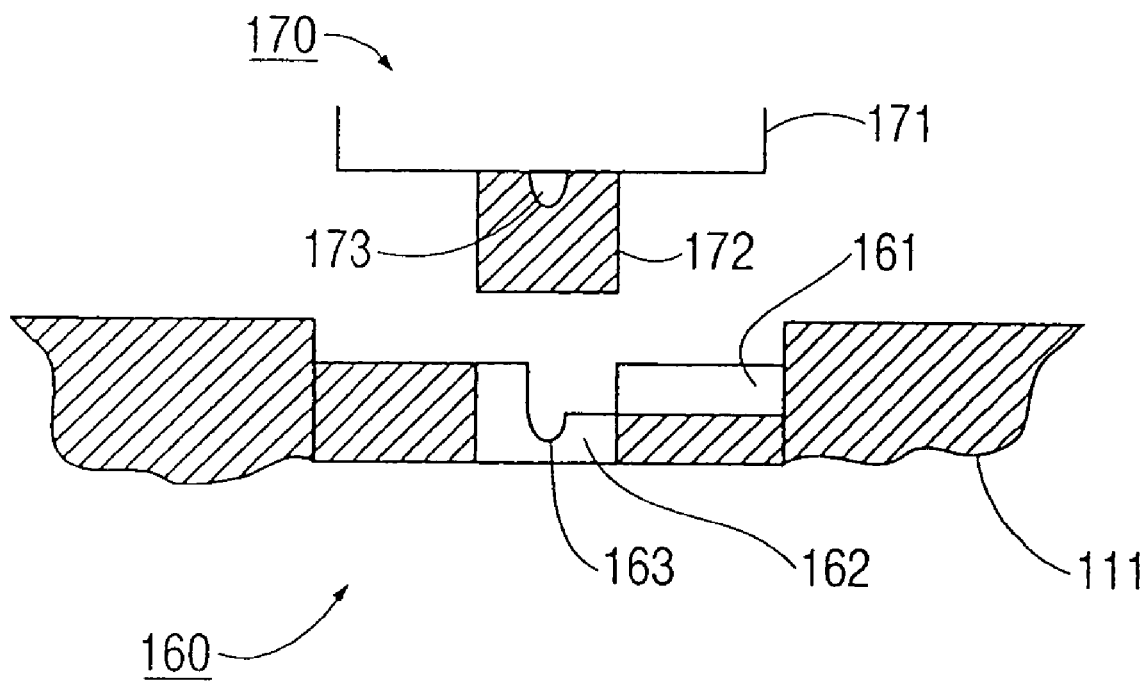
FIG. 50 shows a cross-section view of the hinge portions across line 50—50 in FIG. 20.

FIG. 22 shows a cross-section view of the hinge portions across line 22—22 in FIG. 20. FIG. 50 shows a cross-section view of the hinge portions across line 50—50 in FIG. 20. As shown in FIGS. 22 and 50, the outer post 171 fits into outer rotational-support portion 161 and inner post 172 fits into central portion 164. An attachment mechanism 177 can attach the hinge portion 160 and the hinge portion 170 together. The attachment mechanism 177 can be, for example, a threaded screw aligned, for example, along the pivot axis 125 thereby attaching hinge portion 160 and hinge portion 170. Alternatively, the attachment mechanism 177 can be, for example, a non-threaded pin aligned, for example, along the pivot axis 125. Such a pin can be, for example, heated during manufacture so that the pin retains the attachment of hinge portions 160 and 170.

The arm 173 can travel along inner rotational-support portion 162 when the temple 130 is moved, for example, from an unfolded configuration to a folded configuration, or vice versa. The arm 173 can complimentarily fit into retention portions 163 thereby temporarily securing the position of temple 130 while in the unfolded configuration or folded configuration. In other words, while in the unfolded or folded configuration, the arm 173 is retained within a retention portion 163 to thereby resist movement of the temple 130 from the temporarily locked position. An axial biasing force, for example, allows the temple 130 to be slightly displaced along the pivot axis 125. By overcoming this axial biasing force, the arm 173 can be moved away from the retention portion 163 thereby allowing the temple 130 to be unlocked from the unfolded or folded configuration.

The surface of arm 173 that travels in contact with inner rotational-support portion 162 can have, for example, a rounded convex surface (e.g., a semi-circular cross-section); in such a configuration, the retention portions 163 can have a complimentary concave surface. Alternatively, the arm 173 and retention portions 163 can have other shapes, such as for example, having squared corners.

Figure 23:
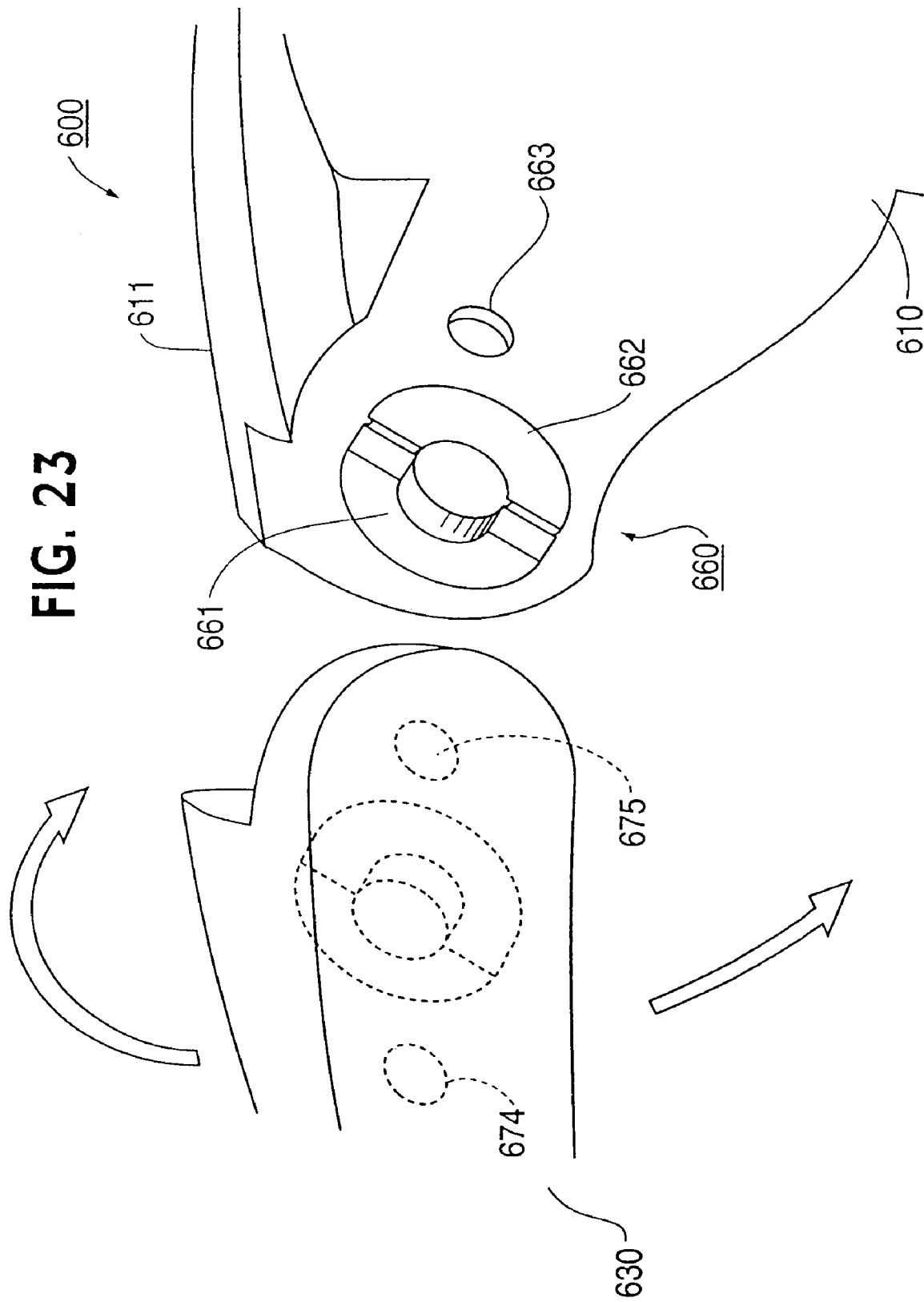
FIG. 23 shows an assembly view of hinge portions of eyeglasses, according to an embodiment of the invention.

FIG. 23 shows an assembly view of hinge portions of eyeglasses, according to an embodiment of the invention. As shown in FIG. 23, the eyeglasses 600 includes end portion 611 of face 610, and temple 630. End portion 611 includes hinge portion 660 having outer rotational-support portion (e.g., track) 661 and inner rotational-support portion (e.g., track) 662. Hinge portion 660 is similar to that described in reference to FIGS. 20 through 22, except that the retention portions 163 within the inner rotational-support portion 662 are not present. Instead, end portion 611 includes retention portions (e.g., indentation) 663 outside of outer rotational-support portion 661 and inner rotational-support portion 662. Temple 630 includes retention portions (e.g., protrusions) 674 and 675 that extend from temple 630 towards end portion 661 of face 610. When the temple 630 is positioned in the unfolded configuration, retention portion 675 temporarily locks (or snaps) into retention portion 663. When the temple 630 is positioned in the folded configuration, retention portion 674 temporarily locks (or snaps) into retention portion 663. In alternative embodiments, only a single retention portion is included within the temple. Although FIG. 23 only shows the hinge portions for temple 630, similar hinge portions can exist for the other temple pivotably coupled to the face 610 (not shown). Note that although only two retention portion sets are show in FIG. 23, any number of such retention portion sets can be present, of any appropriate size, at any appropriate location.

Figure 24:
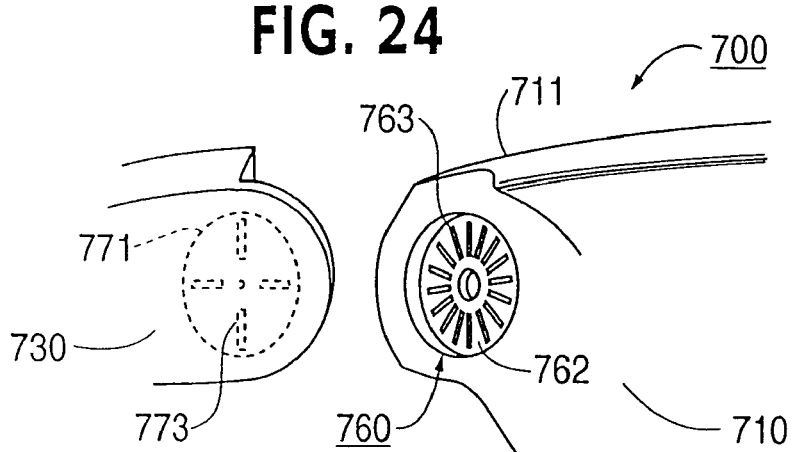
FIG. 24 shows an assembly view of hinge portions of eyeglasses, according to another embodiment of the invention.

FIG. 24 shows an assembly view of hinge portions of eyeglasses, according to another embodiment of the invention. As shown in FIG. 24, eyeglasses 700 includes end portion 711 of face 710, and temple 730. End portion 711 includes hinge portion 760 having inner rotational-support portion (e.g., track) 762 with retention portions (e.g., indentations) 763. Temple 730 includes outer post 771 on which arms 773 are disposed. Outer post 771 fits into inner rotational-support portion 762 and arms 773 temporarily lock (or snap) into mating retention portions 762. As temple 730 moves from an unfolded configuration to a folded configuration (or vice versa), the position of temple 730 can be temporarily locked. Thus, temple 730 can move with a ratchet-type motion thereby temporarily locking the position of temple 730 at the unfolded configuration, the folded configuration, and positions between both.

Figure 25:
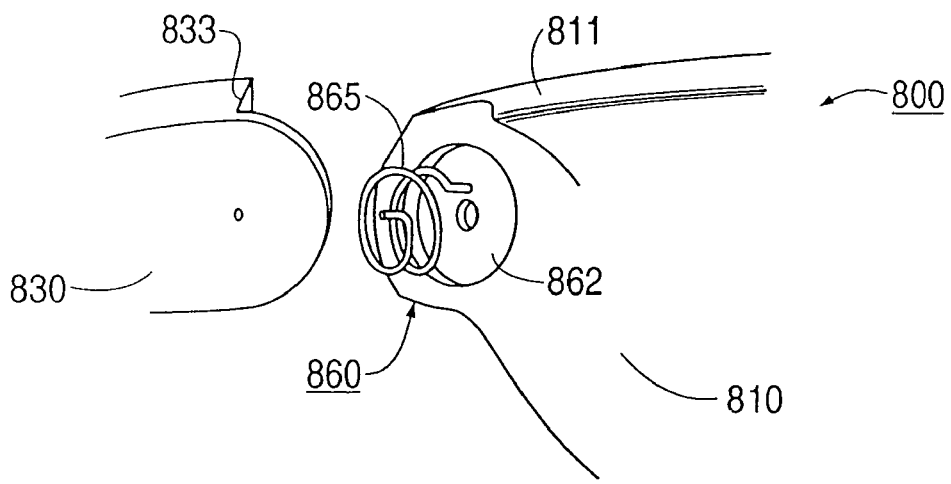
FIG. 25 shows an assembly view of hinge portions of eyeglasses, according to another embodiment of the invention.

FIG. 25 shows an assembly view of hinge portions of eyeglasses, according to another embodiment of the invention. As shown in FIG. 25, eyeglasses 800 includes end portion 811 of face 810, and temple 830. End portion 811 includes hinge portion 860 having a rotational-support portion (e.g., well) 862 and a tension spring 865. One end of tension spring 865 can be affixed to a location within rotational-support portion 862 and the other end of tension spring 865 can be affixed to a location on temple 830. As the movement of temple 830 from an unfolded configuration to a folded configuration is initiated, the tension spring 865 can provide a rotation force to cause the temple 830 to move to the folded configuration without further externally applied force. In other words, by tapping temple 830 in the unfolded configuration, the tension spring 865 causes the temple 830 to automatically collapse to the folded configuration. The movement of the temple 830 can be controlled in the unfolded configuration by the mechanical stop 833. The embodiment shown in FIG. 25 can be combined with other hinge embodiments described herein. Note that although the hinge shown in FIG. 25 relates to the temples automatically collapsing from the unfolded configuration to the folded configuration, alternative hinges can be configured to automatically open the temples from a folded configuration to an unfolded configuration.

Figure 26:
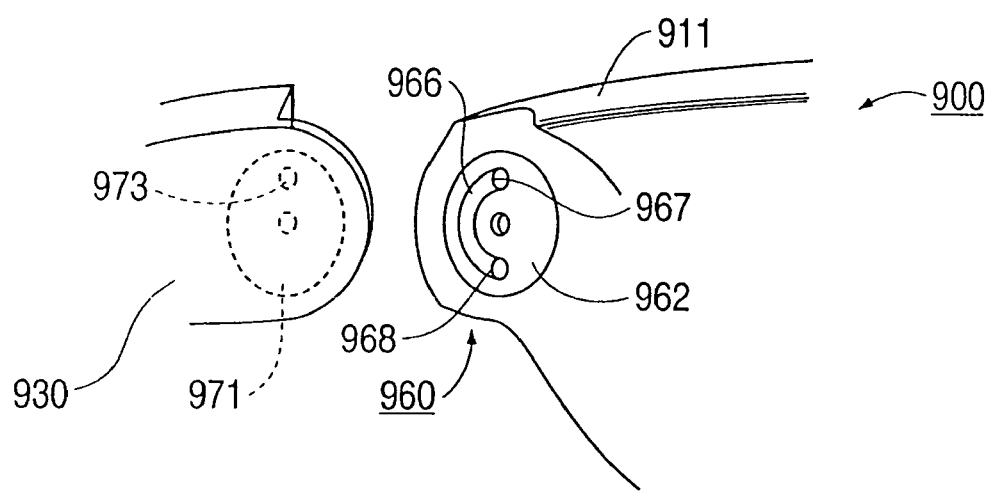
FIG. 26 shows an assembly view of hinge portions of eyeglasses, according to another embodiment of the invention.

FIG. 26 shows an assembly view of hinge portions of eyeglasses, according to another embodiment of the invention. As shown in FIG. 26, eyeglasses 900 includes end portion 911 of face 910, and temple 930. End portion 911 includes hinge portion 960 having a rotational-support portion (e.g., a well) 962 and a rotational-support portion (e.g., a channel) 966. Rotational-support portion 966 includes retention portions (e.g., indentations) 967 and 968. Temple 930 includes post 971 on which retention portion (e.g., a protrusion) 973 is disposed. As temple 830 moves from an unfolded configuration to a folded configuration, retention portion 973 of temple 930 moves within rotational-support portion 966 and temporarily locks (or snaps) into retention portion 968. Similarly, as temple 830 moves from the folded configuration to the unfolded configuration, retention portion 973 of temple 930 moves within channel 966 and temporarily locks (or snaps) into retention portion 967.

Figure 27:
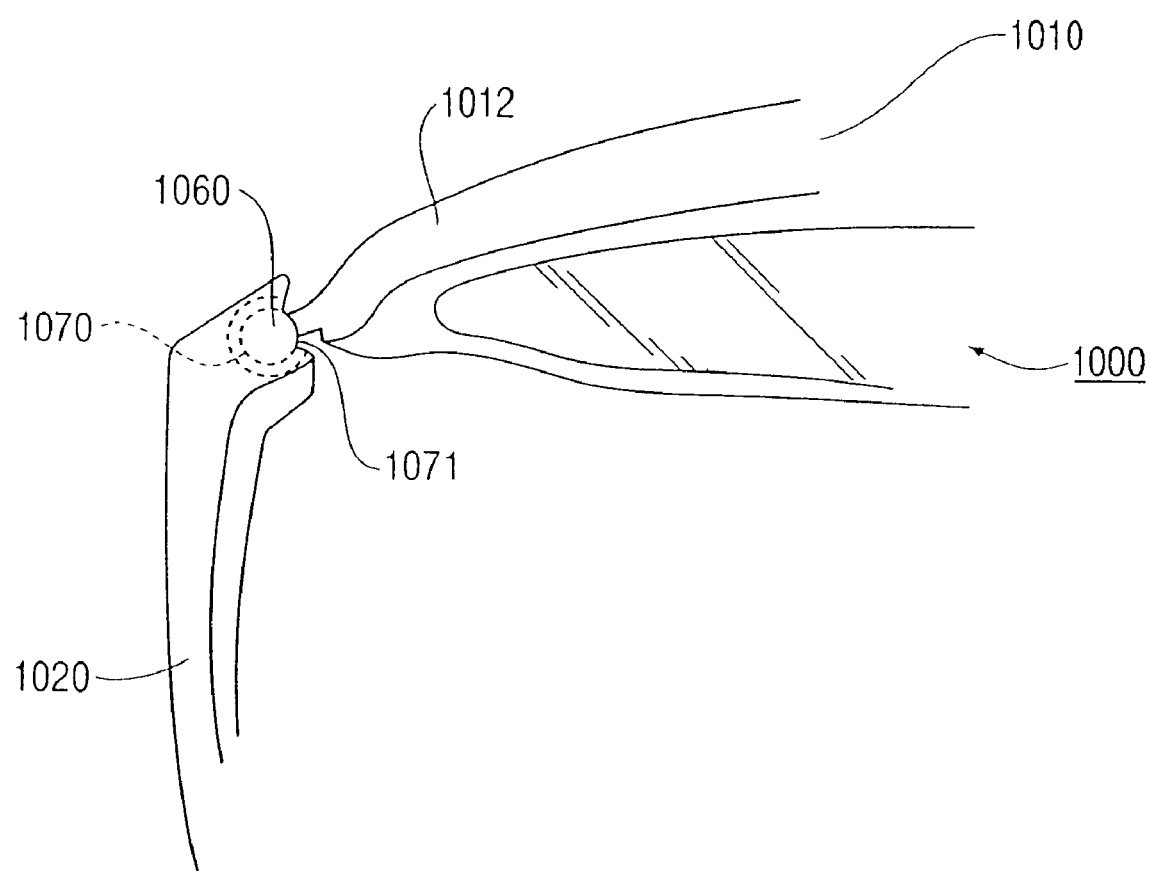
FIG. 27 shows a top view of a portion of eyeglasses, according to another embodiment of the invention.

FIG. 27 shows a top view of a portion of eyeglasses, according to an embodiment of the invention. As shown in FIG. 27, eyeglasses 1000 includes end portion 1012 of face 1010, and temple 1020. End portion 1012 includes a hinge portion ball 1060, and temple 1020 includes a socket 1070 into which the hinge portion ball 1060 fits. Thus, hinge portion ball 1060 and socket 1070 form a ball and socket hinge about which temple 1020 can pivot when moving from an unfolded configuration to a folded configuration (and vice versa). Temple 1020 includes a rotation-limit portion (e.g., a collar) 1071 that defines the extent about which the ball and socket hinge can rotate. In other words, the ball and socket hinge can rotate about multiple pivot axes within a cone defined by the rotation-limit portion 1071.

Figure 28:
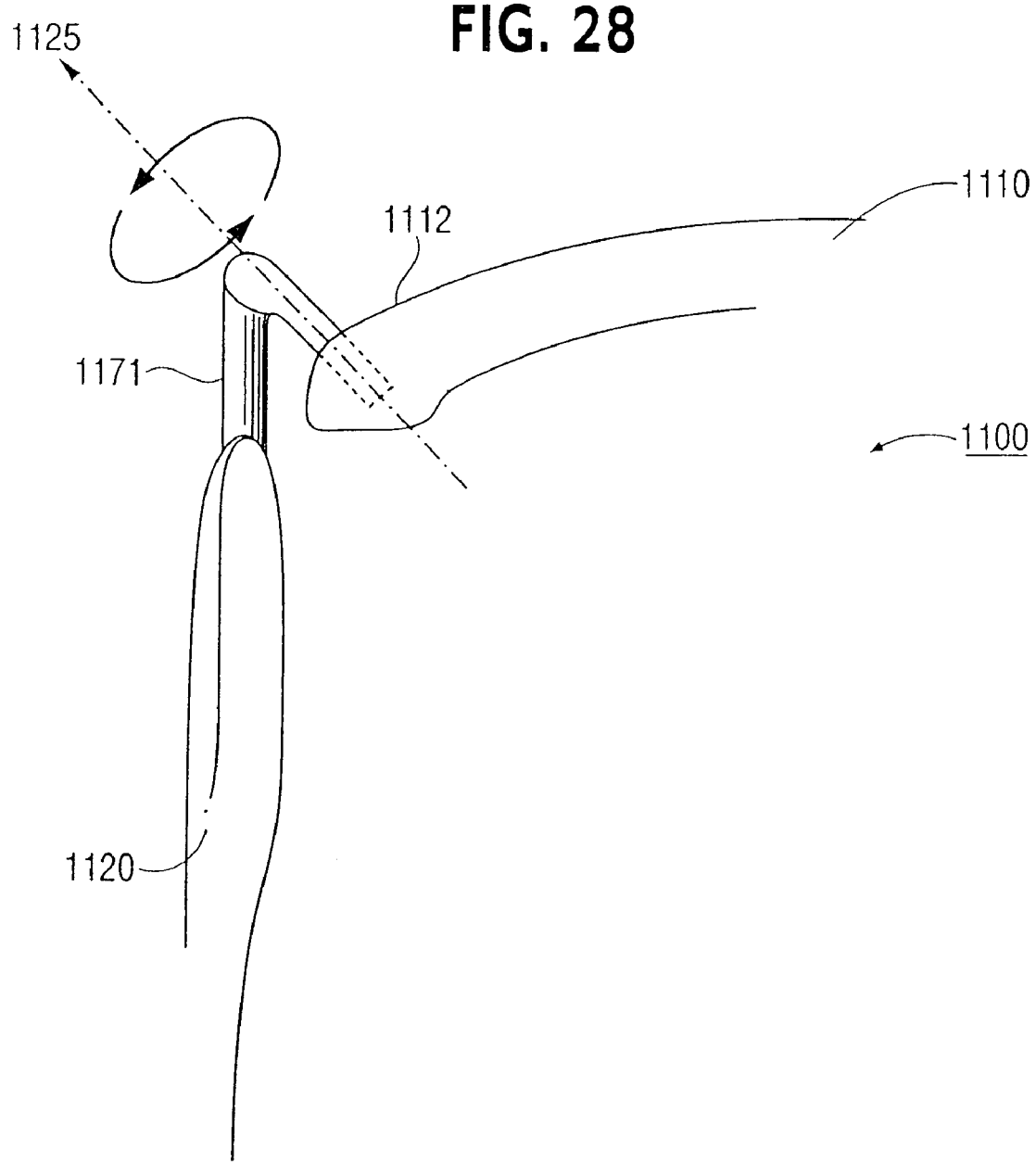
FIG. 28 shows a top view of a portion of eyeglasses, according to another embodiment of the invention.

FIG. 28 shows a top view of a portion of eyeglasses, according to an embodiment of the invention. As shown in FIG. 28, eyeglasses 1100 includes end portion 1112 of face 1110, and temple 1120. Temple 1020 includes an elbow pin 1171 coupled into end portion 1112. Temple 1120 can pivot about pivot axis 1125 when moving from an unfolded configuration to a folded configuration (and vice versa). The pin 1171 can be retained within the hole of face 1110 by, for example, a rivet top or cap (not shown) so that the pin 1171 can rotate within the hole of face 1110.

Figure 29:
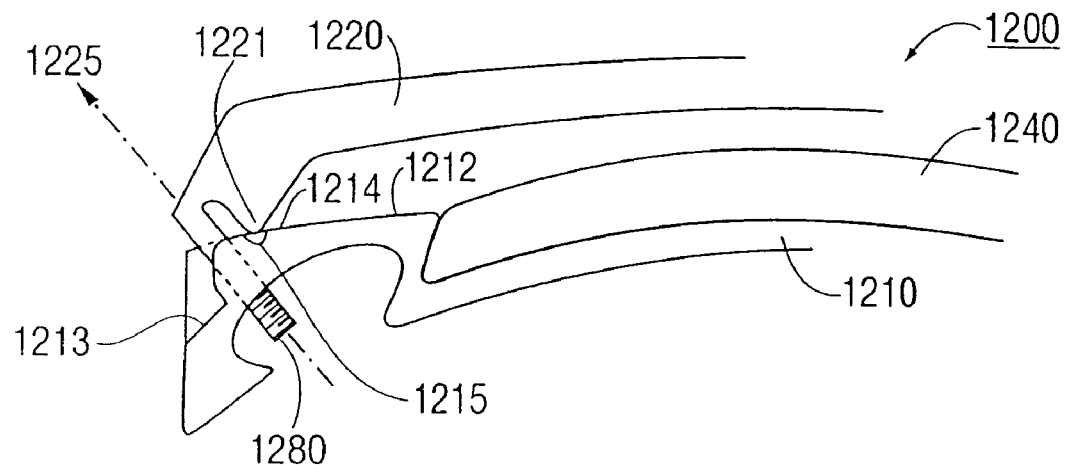
FIG. 29 shows a top view of a portion of eyeglasses in a folded configuration, according to another embodiment of the invention.
Figure 30:
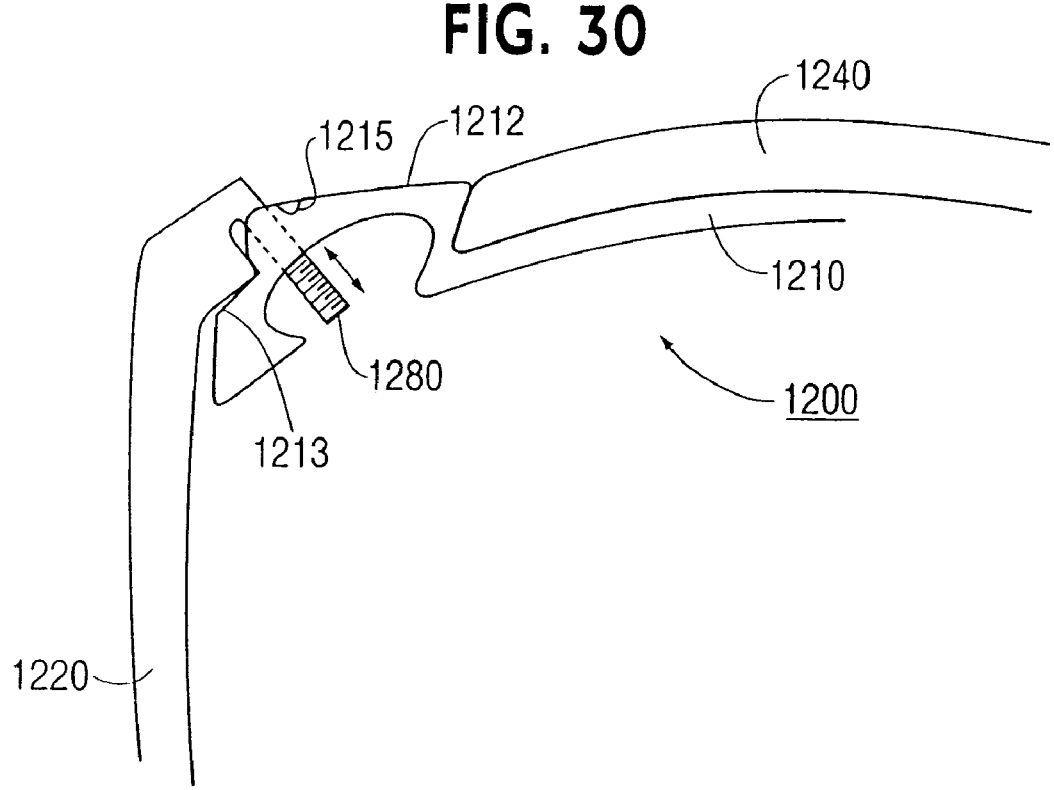
FIG. 30 shows a top view of the portion of the eyeglasses shown in FIG. 29 while in the unfolded configuration.

FIG. 29 shows a top view of a portion of eyeglasses in a folded configuration, according to another embodiment of the invention. FIG. 30 shows a top view of the portion of the eyeglasses shown in FIG. 29 while in the unfolded configuration. Eyeglasses 1120 includes end portion 1212 of face 1210, and temple 1220. Temple 1220 is pivotably coupled to face 1210 about pivot axis 1225. A tension member 1280 is also coupled to temple 1220 and face 1210 about the pivot axis 1225. The tension member 1280 can be, for example, a spring, that provides a tension force along the pivot axis 1225. Tension member 1280 causes temple 1220 to be pulled down the pivot axis 1225 when the temple 1220 is moved from a folded configuration to an unfolded configuration.

Said another way, tension member 1280 allows temple 1220 to move along different points of pivot axis 1225 when moving between the unfolded configuration and the folded configuration. More specifically, end portion 1212 includes contact portion 1213 and contact portion 1214, the locations of which are parallel to different points from the pivot axis 1225. Contact portion 1214 includes an indentation 1215. When the temple 1220 is in the folded configuration, temple 1220 is in contact with contact portion 1214, and a portion 1221 of temple 1220 is temporarily locked (or snapped) within retention portion (e.g., an indentation) 1215. When the temple is in the unfolded configuration, temple 1220 is in contact with contact portion 1213. The tension member 1280 allows the temple 1220 to push out along the pivot axis 1225 when in the folded configuration, and allows the temple 1220 to be pulled down along the pivot axis 1225 when in the unfolded configuration.

Figure 31:
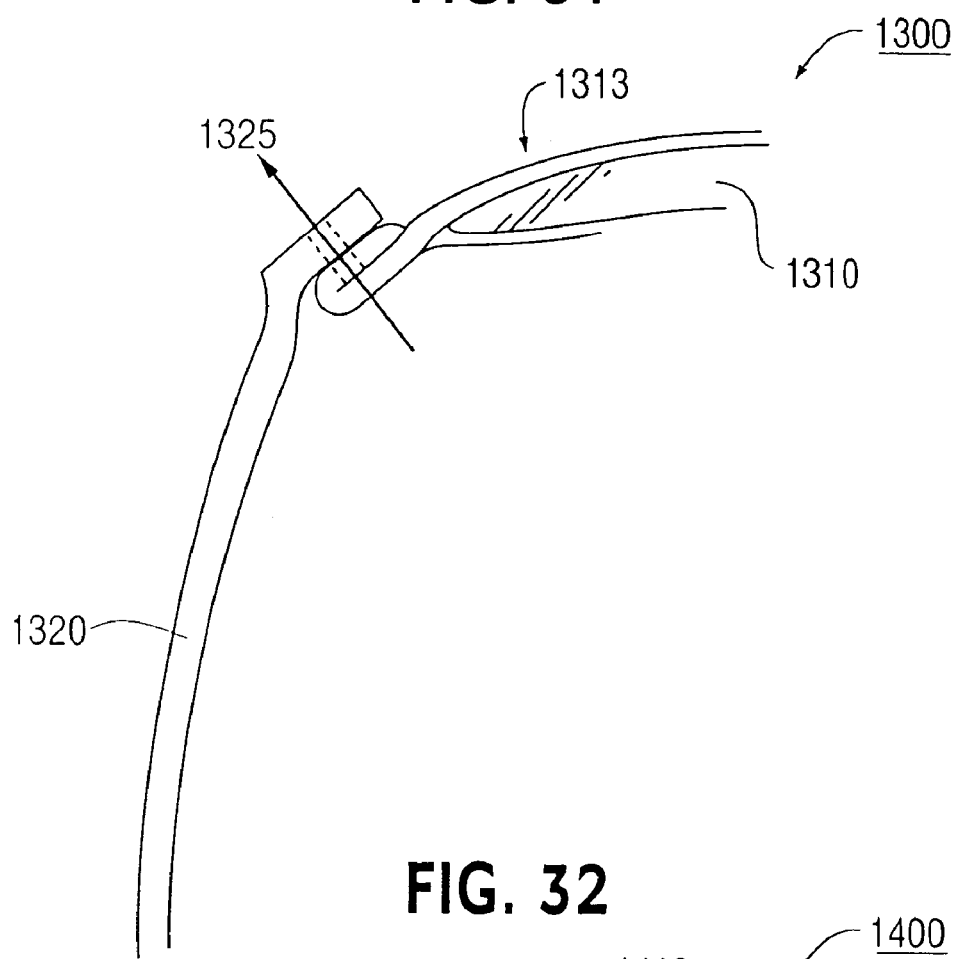
FIG. 31 shows a top view of a portion of eyeglasses, according to another embodiment of the invention.

FIG. 31 shows a top view of a portion of eyeglasses, according to another embodiment of the invention. As shown in FIG. 31, eyeglasses 1300 includes temple 1320 and end portion 1313 of face 1310. Temple 1320 is pivotably coupled to end portion 1313 along pivot axis 1325.

Figure 32:
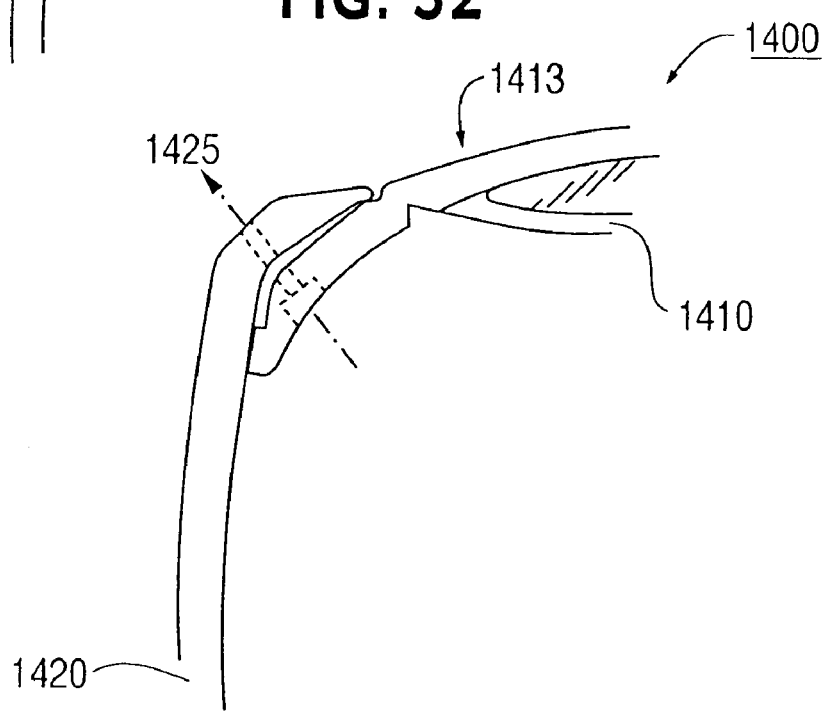
FIG. 32 shows a top view of a portion of eyeglasses, according to another embodiment of the invention.

FIG. 32 shows a top view of a portion of eyeglasses, according to another embodiment of the invention. As shown in FIG. 32, eyeglasses 1400 includes temple 1420 and end portion 1413 of face 1410. Temple 1420 is pivotable coupled to end portion 1413 along pivot axis 1425.

Although the above-described embodiments have related, in general, to a single hinge connection for pivotably coupling a temple to an end portion of the face, more than one hinge connection is possible. For example, two hinge connections can be used to pivotably couple a temple to an end portion of the face to thereby allow the temple to be movable between an unfolded configuration and a folded configuration where the temple is on the outer side of the face. As following embodiments illustrate, such a dual hinge can pivotably connect a temple to an end portion of the face, for example, where the corresponding two pivot axes are not parallel. The two hinge connections can be located at different locations of the temple or can be located close together.

FIG. 33 shows a perspective view of a portion of eyeglasses having a dual hinge, according to an embodiment of the invention. As shown in FIG. 33, eyeglasses 1500 has face 1510, lens 1540 and temple portions 1520 and 1530. Temple portion 1520 is pivotably coupled to face 1510 along pivot axis 1525 by hinge 1560. Temple portion 1520 is pivotably coupled to temple portion 1521 along pivot axis 1524 by hinge 1523. When moving from an unfolded configuration to a folded configuration, the temple portion 1521 can be moved along pivot axis 1524 so that temple portion 1521 is parallel to and adjacent with inner side or outer side of temple portion 1520. Then, temple portion 1521 can be moved along pivot axis 1525 so that temple portion 1520 and 1521 are adjacent to the outer side of face 1510.

Figure 48:
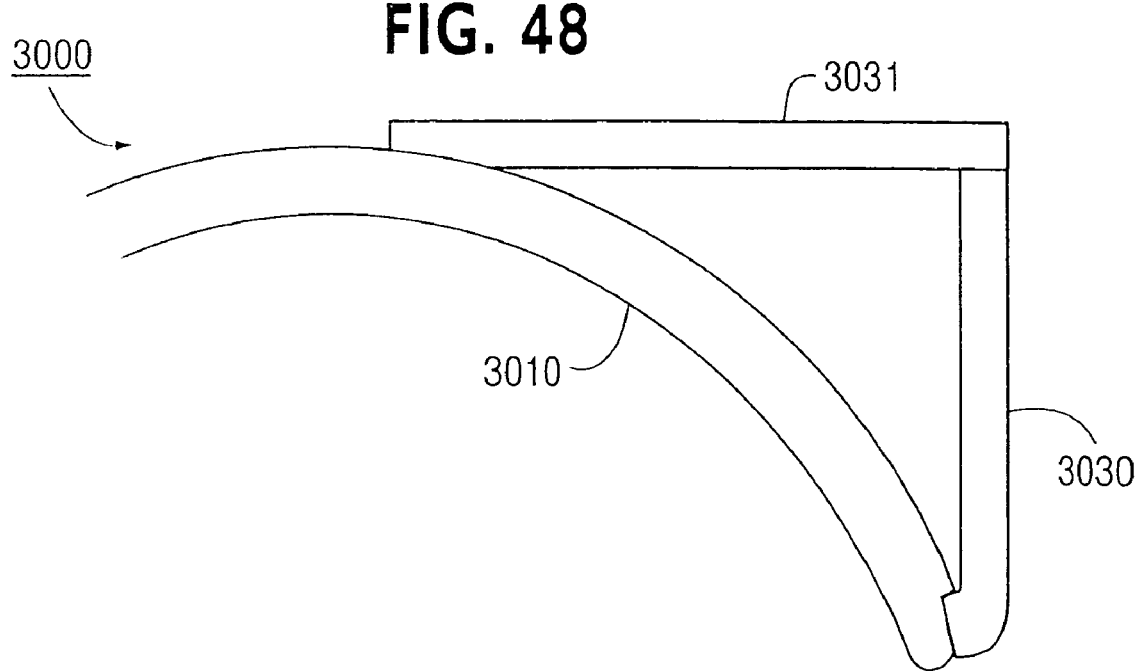
FIG. 48 shows a top view of a portion of eyeglasses face and temples having different degrees of curvature, according to an embodiment of the invention.

Although the temples and face shown in FIG. 33 have similar degrees of curvature, alternative embodiments are possible where that is not the case. For example, FIG. 48 shows a top view of a portion of eyeglasses face and temples having different degrees of curvature, according to an embodiment of the invention. As shown in FIG. 48, temple portions 3030 and 3031 can be configured so that, when in a folded configuration, at least a part of the temple portion 3010 is substantially adjacent to a portion of face 3010. This embodiment illustrates an example where the temple portions have a relatively little to no degree of curvature.

Figure 49:
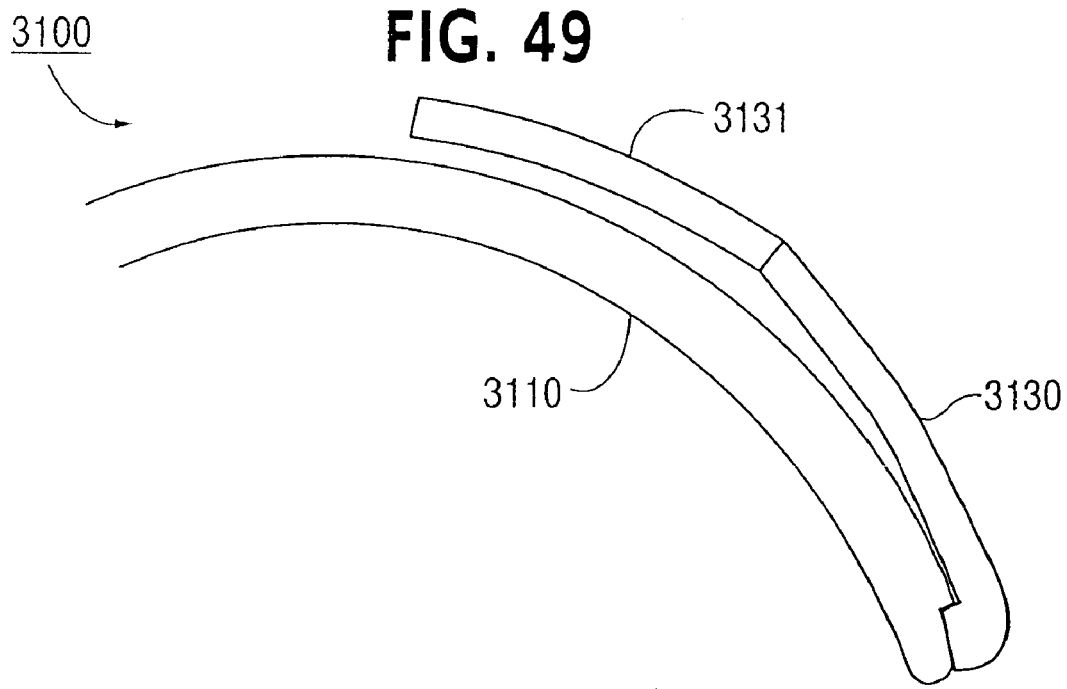
FIG. 49 shows a top view of a portion of eyeglasses face and temples having different degrees of curvature, according to another embodiment of the invention.

FIG. 49 shows a top view of a portion of eyeglasses face and temples having different degrees of curvature, according to another embodiment of the invention. As shown in FIG. 49, temple portions 3130 and 3131 can be configured so that, when in a folded configuration, at least a part of both temple portions 3130 and 3131 is substantially adjacent to a portion of face 3010.

FIG. 34 shows a perspective view of a portion of eyeglasses having a dual hinge, according to another embodiment of the invention. Eyeglasses 1600 has face 1610, lens 1640 and temple portions 1620 and 1630. Temple portion 1620 is pivotably coupled to face 1610 along pivot axis 1625 by hinge 1660. Temple portion 1620 is pivotably coupled to temple portion 1621 along pivot axis 1624 by hinge 1623. Similar to the embodiment shown in FIG. 33, when moving from an unfolded configuration to a folded configuration, the temple portion 1621 can be moved along pivot axis 1624 so that temple portion 1621 is parallel to and adjacent with upper side or lower side of temple portion 1620. Then, temple portion 1621 can be moved along pivot axis 1625 so that temple portion 1620 and 1621 are adjacent to the outer side of face 1610.

Figure 35:
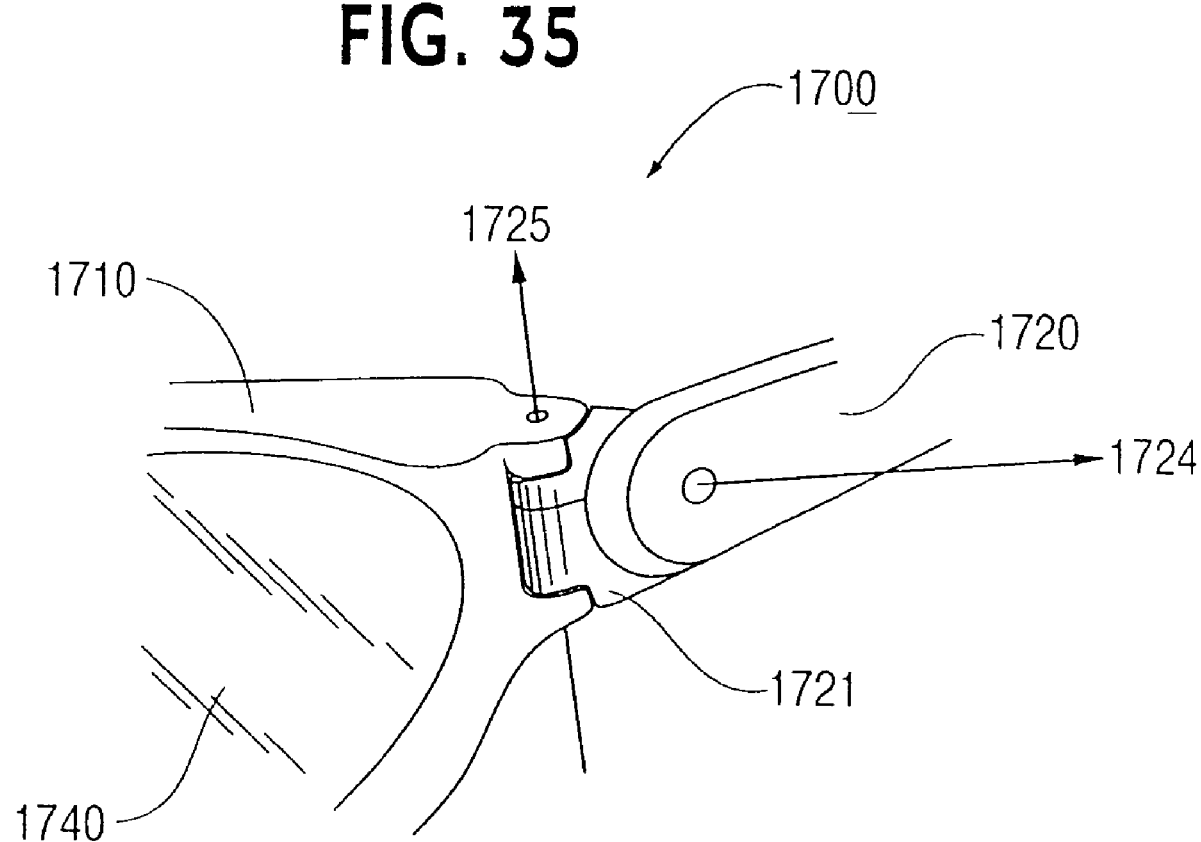
FIG. 35 shows a perspective view of a portion of eyeglasses having a dual hinge, according to another embodiment of the invention.

FIG. 35 shows a perspective view of a portion of eyeglasses having a dual hinge, according to another embodiment of the invention. Eyeglasses 1700 has face 1710, lens 1740 and temple portions 1720 and 1730. Temple portion 1720 is pivotably coupled to temple portion 1721 along pivot axis 1724. Temple portion 1721 is pivotably coupled to face 1710 along pivot axis 1725. When moving from an unfolded configuration to a folded configuration, the temple portion 1720 can be moved along pivot axis 1724, for example, about 180 degrees. Then, temple portion 1721 can be moved along pivot axis 1725 so that temple portion 1720 is adjacent to the outer side of face 1710. Note that unlike the dual hinge embodiments shown in FIGS. 33 and 35, the pivot axis 1724 and 1725 of eyeglasses 1700 are located close together and can intersect.

Figure 36:
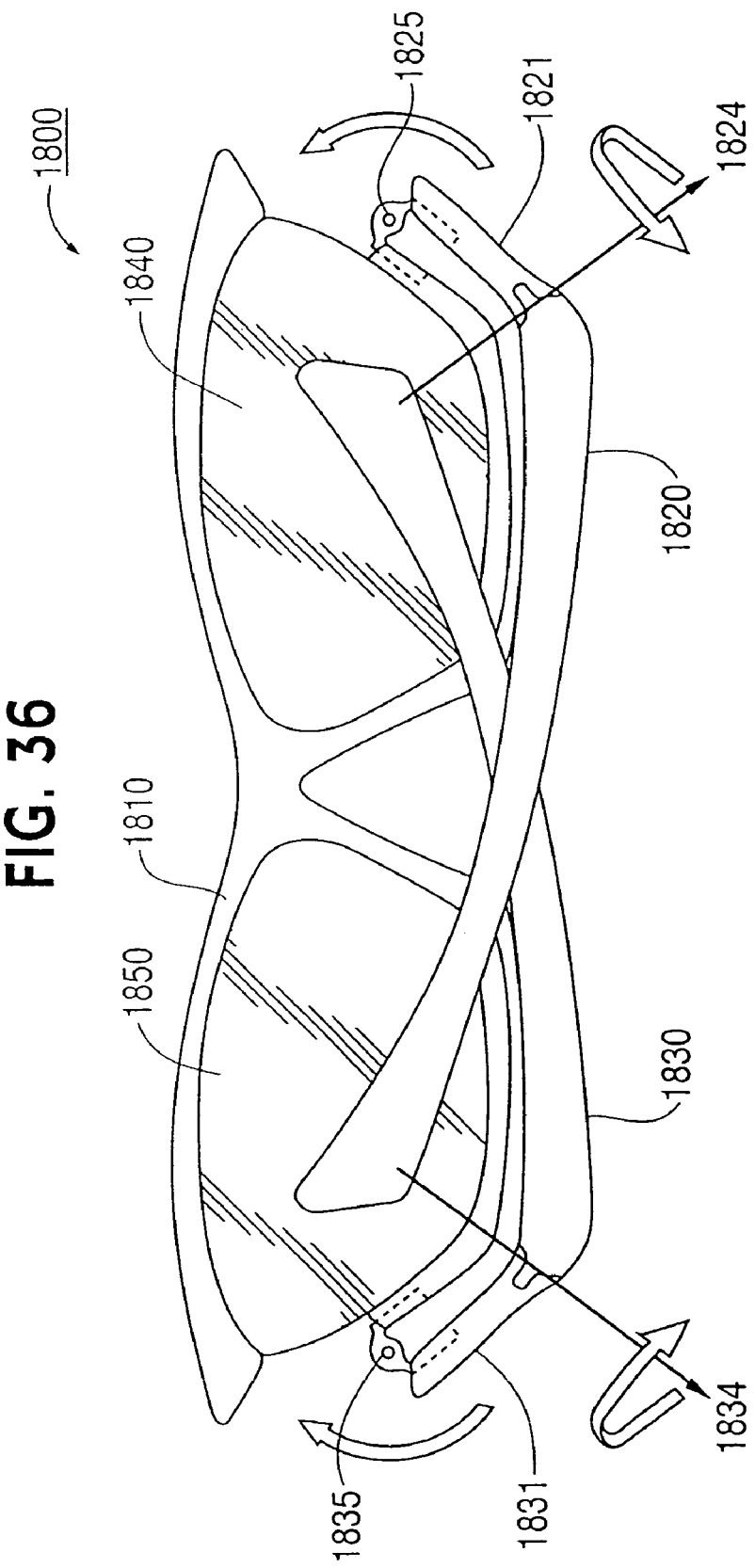
FIG. 36 shows a front view of eyeglasses having dual hinges, according to another embodiment of the invention.

FIG. 36 shows a front view of eyeglasses having dual hinges, according to another embodiment of the invention. Eyeglasses 1800 has face 1810, lens 1840 and 1850, temple portions 1820, 1821, 1830 and 1831. Temple portion 1820 is pivotably coupled to temple portion 1821 along pivot axis 1824. Temple portion 1821 is pivotably coupled to face 1810 along pivot axis 1825. Temple portion 1830 is pivotably coupled to temple portion 1831 along pivot axis 1834. Temple portion 1831 is pivotably coupled to face 1810 along pivot axis 1835. When moving from a folded configuration to an unfolded configuration, the temple portion 1821 can be moved along pivot axis 1825, for example, about 180 degrees so that temple portion 1821 is adjacent to lens 1840 and completes a portion of the perimeter of face 1810.

Similarly, the temple portion 1831 can be moved along pivot axis 1835, for example, about 180 degrees so that temple portion 1831 is adjacent to lens 1850 and completes a portion of the perimeter of face 1810. Then, temple portion 1820 can be moved along pivot axis 1824 and temple portion 1830 can be moved along pivot axis 1834. Of course, the temple portions 1820 and 1830 can be moved along pivot axes 1824 and 1834, respectively, in any order or simultaneously.

Note that in this embodiment, when in the folded configuration, the temple portions 1820 and 1830 are adjacent to the opposite lenses 1850 and 1840 while adjacent to the outer side of the face 1810. In other words, when in the folded configuration, the right temple portion 1820 (from the front view perspective) is adjacent to the left lens 1850, and the right temple portion 1830 is adjacent to the left lens 1840. Note that in alternative embodiments, each temple portion can be adjacent to a portion of both lenses.

Many of the above-described embodiments can have an added feature that allows the temples to be retained on the outer side of the face. More specifically, many of the above-described eyeglasses can have a retention portion (e.g., a protrusion or an elevated structure(s)) on the outer side of the face on to which the temple(s) can temporarily lock (or snap or rest against). Such retention portion(s) can be located in a number of locations on the outer side of the face depending on specific location the temple(s) while in the folded configuration for a particular embodiment.

Figure 37:
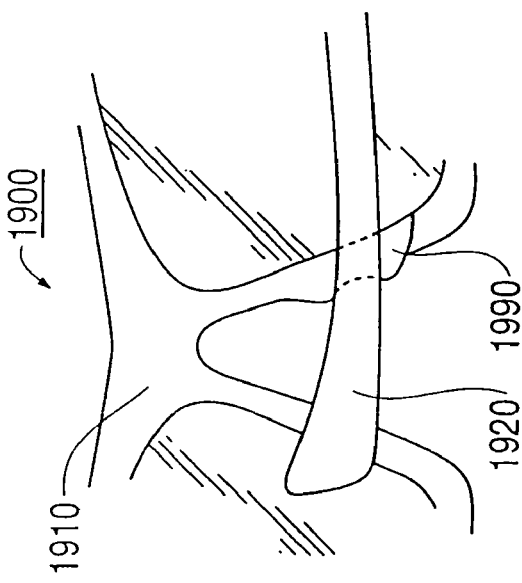

FIG. 37 shows a front view of a portion of eyeglasses having a retention portion, according to an embodiment of the invention. Eyeglasses includes face 1910, temple 1920 and retention portion (e.g., an elevated structure) 1990. As shown in FIG. 37, retention portion 1990 can be, for example, a protrusion on the outer side of face 1910. As the temple 1920 is pivotably moved about the face 1910 from an unfolded configuration to a folded configuration, the temple 1920 can be temporarily locked (or snapped) into to position on the face 1910 by retention portion 1990.

Figure 38:
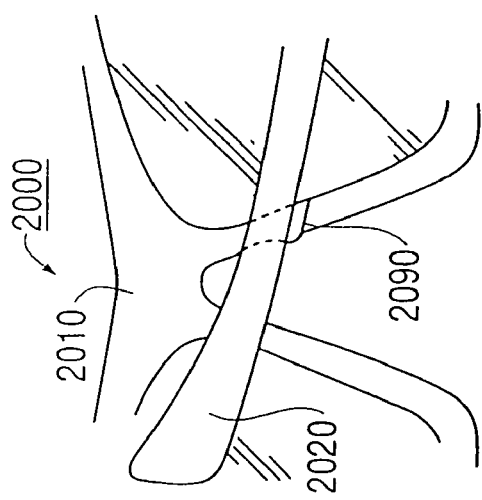

FIG. 38 shows a front view of a portion of eyeglasses having a retention portion, according to another embodiment of the invention. Eyeglasses includes face 2010, temple 2020 and retention portion 2090. Here, the retention portion 1920 is located closer to the bridge of the face 2010 than for eyeglasses 1900 shown in FIG. 27.

Figure 39:
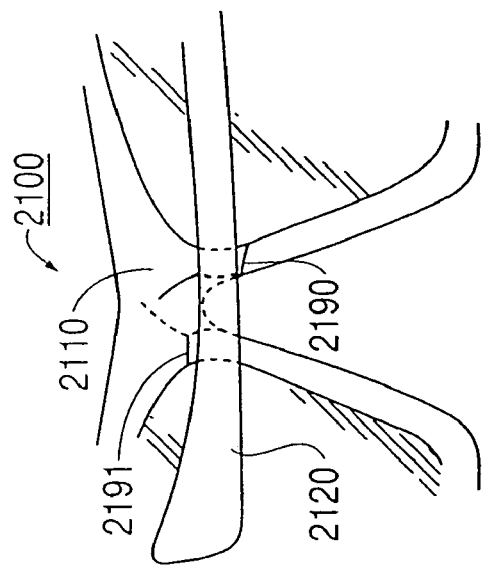
FIGS. 37 through 41 show front views of a portion of eyeglasses having a temple retainer, according to five alternative embodiments of the invention.

FIG. 39 shows a front view of a portion of eyeglasses having a retention portion, according to yet another embodiment of the invention. Eyeglasses includes face 2110, temple 2120 and retention portions 2190 and 2191. As shown in FIG. 39, retention portions 2190 and 2191 can be, for example, protrusions on the outer side of face 2110 near the bridge. As the temple 2120 is pivotably moved about the face 2110 from an unfolded configuration to a folded configuration, the temple 2120 can be temporarily locked (or snapped) into to position on the face 2110 between retention portions 2190 and 2191 retention portion 2191 temporarily restricts the upward movement of temple 2120 and retention portions 2190 temporarily restricts the downward movement of temple 2120.

Figure 40:
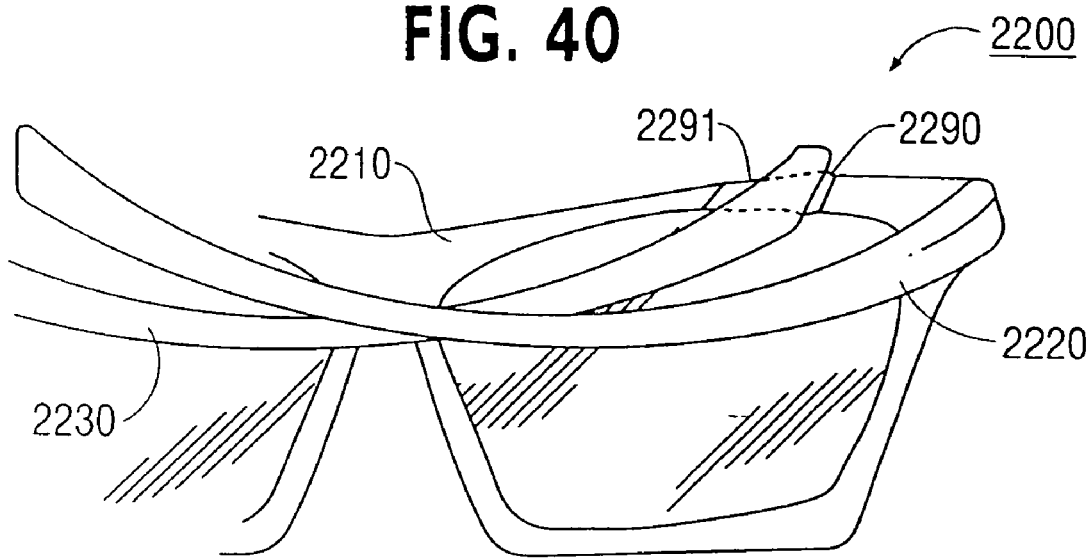

FIG. 40 shows a front view of a portion of eyeglasses having a retention portion, according to an embodiment of the invention. Eyeglasses includes face 2210, temples 2220 and 2230 and retention portions 2290 and 2291. Here, the retention portions 2220 and 2230 are located on the top portion of the face 2010. As the temple 2230 is pivotably moved about the face 2110 from an unfolded configuration to a folded configuration, the temple 2230 can be temporarily locked (or snapped) into to position on the face 2210 between retention portions 2290 and 2291. Retention portion 2291 temporarily restricts the upward movement of temple 2230 and retention portion 2290 temporarily restricts the downward movement of temple 2230.

Figure 41:
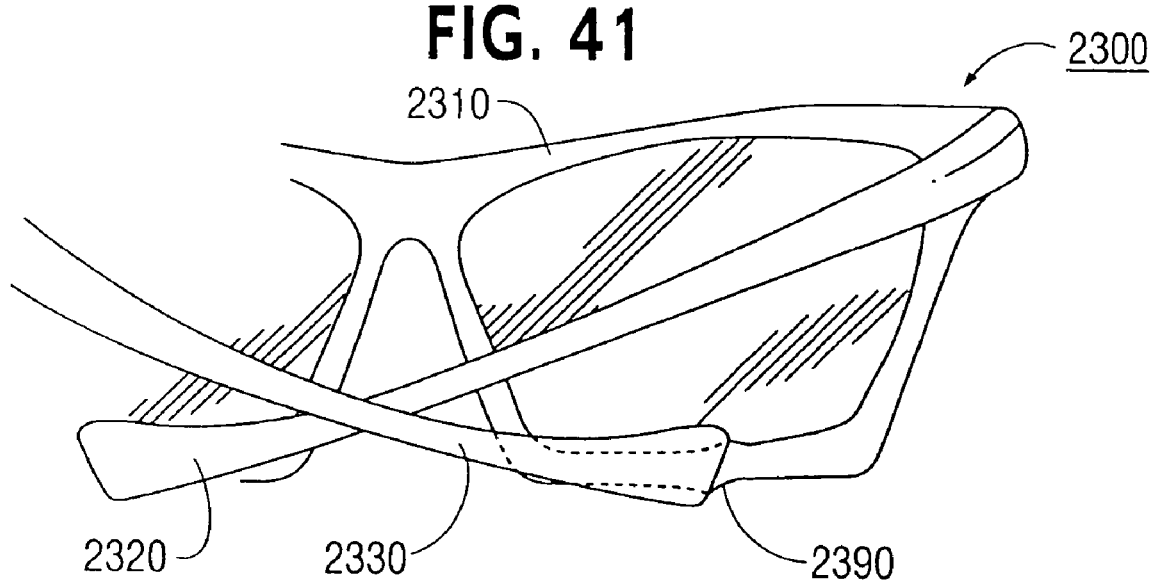

FIG. 41 shows a front view of a portion of eyeglasses having a retention portion, according to an embodiment of the invention. Eyeglasses includes face 2310, temples 2320 and 2330, and retention portion 2390. Here, the retention portion 2390 is located on the lower portion of the face 2310. As the temple 2330 is pivotably moved about the face 2110 from an unfolded configuration to a folded configuration, the temple 2330 can be temporarily locked (or snapped) into to position by retention portion 2390.

Although FIGS. 37 through 41 show an retention portion(s) for one temple, the remaining temple can also have a similar retention portion(s). The retention portions(s) for the two temples need not be the same, but rather can be a combination of retention portions (s) shown in FIGS. 27 through 41, or combined with a single retention portion or stop.

Similar to the manner in which the retention portion(s) can be disposed about various locations of the eyeglasses frame, retention portion(s) can also be disposed on the temples themselves. Thus, when the eyeglasses are in a folded configuration, the relative position of the temples with respect to each other can be maintained.

Figure 42:
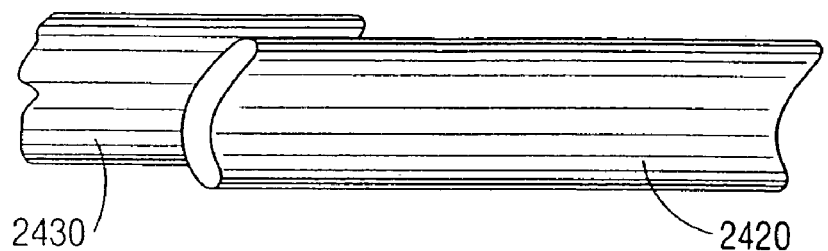
FIGS. 42 through 45 show perspective views of temples while in a folded configuration, according to four embodiments of the invention.

FIG. 42 shows a perspective view of temples while in a folded configuration, according to an embodiment of the invention. As shown in FIG. 42, the temples 2420 and 2430 can have an interlocking, curved shape. More specifically, temple 2420 can have a concave outer side and temple 2430 can have a convex inner side. When the temples 2420 and 2430 are in an overlapping arrangement (such as that shown, for example, in FIG. 5), the temples can be temporarily locked (or snapped) together.

Figure 43:
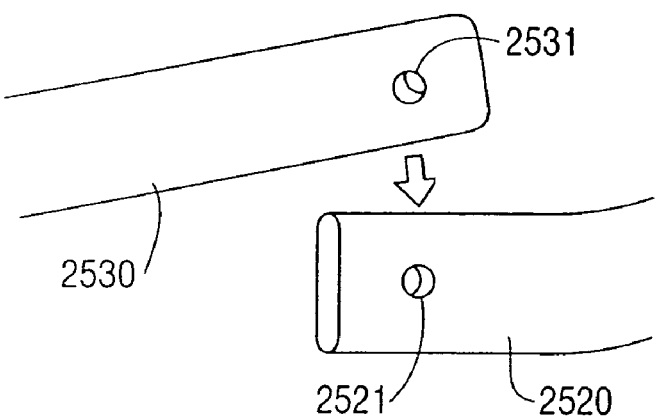

FIG. 43 shows a perspective view of temples while in a folded configuration, according to an embodiment of the invention. As shown in FIG. 43, the temples 2520 and 2530 can have a complementary indentation and protrusion. More specifically, temple 2520 can have an indentation 2521 and temple 2530 can have a retention portion (e.g., protrusion) 2531. When the temples 2520 and 2530 are in an overlapping arrangement (such as that shown, for example, in FIG. 5), the temples can be temporarily locked (or snapped) together.

Figure 44:
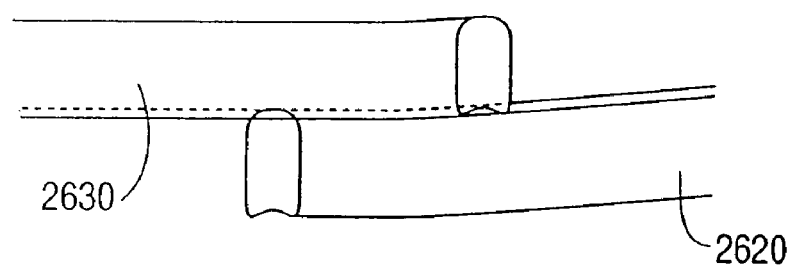

FIG. 44 shows a perspective view of temples while in a folded configuration, according to an embodiment of the invention. As shown in FIG. 44, the temples 2620 and 2630 can have an interlocking, curved shape. More specifically, temple 2620 can have a concave upper side and temple 2630 can have a convex lower side. When the temples 2420 and 2430 are in an adjacent arrangement (such as that shown, for example, in FIG. 9), the temples can be temporarily locked (or snapped) together. In an alternative embodiment, the temples can be in an adjacent arrangement switched from that shown in FIG. 44.

Figure 45:
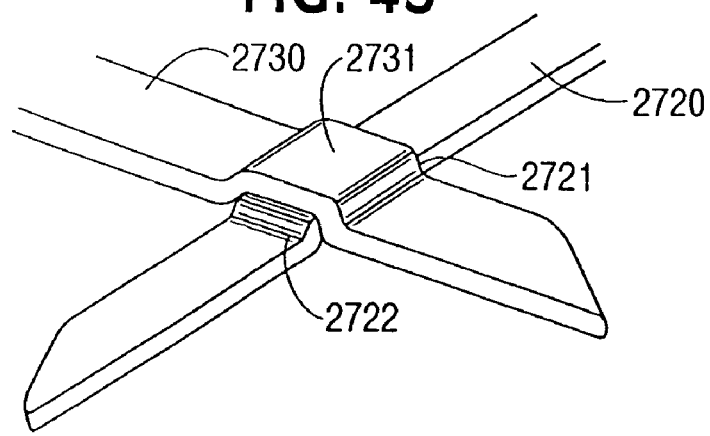

FIG. 45 shows a perspective view of temples while in a folded configuration, according to an embodiment of the invention. As shown in FIG. 45, the temples 2720 and 2730 can have complementary retention portions (e.g., protrusions and indentation, respectively). More specifically, temple 2720 can have retention portion (e.g., protrusions) 2721 and 2722, and temple 2730 can have retention portion (e.g., an indentation) 2731. When the temples 2720 and 2730 are in a crossed arrangement (such as that shown, for example, in FIG. 13), the temples can be temporarily locked (or snapped) together. In an alternative embodiment, the temples can be in a crossed arrangement switched from that shown in FIG. 45.

Figure 46:
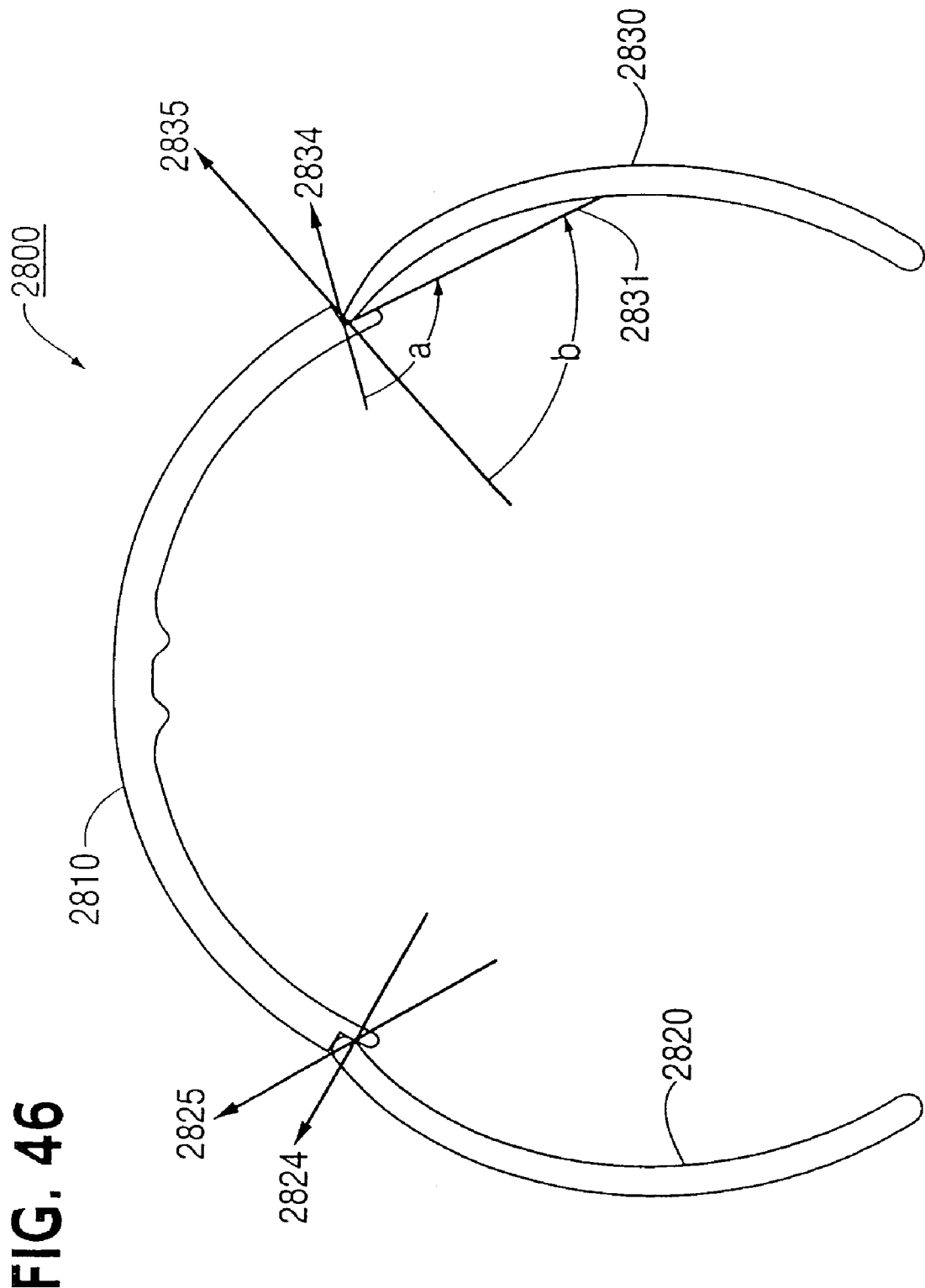
FIG. 46 shows a top view of eyeglasses having pivot axes different from the frame normal, according to an embodiment of the invention.
Figure 47:
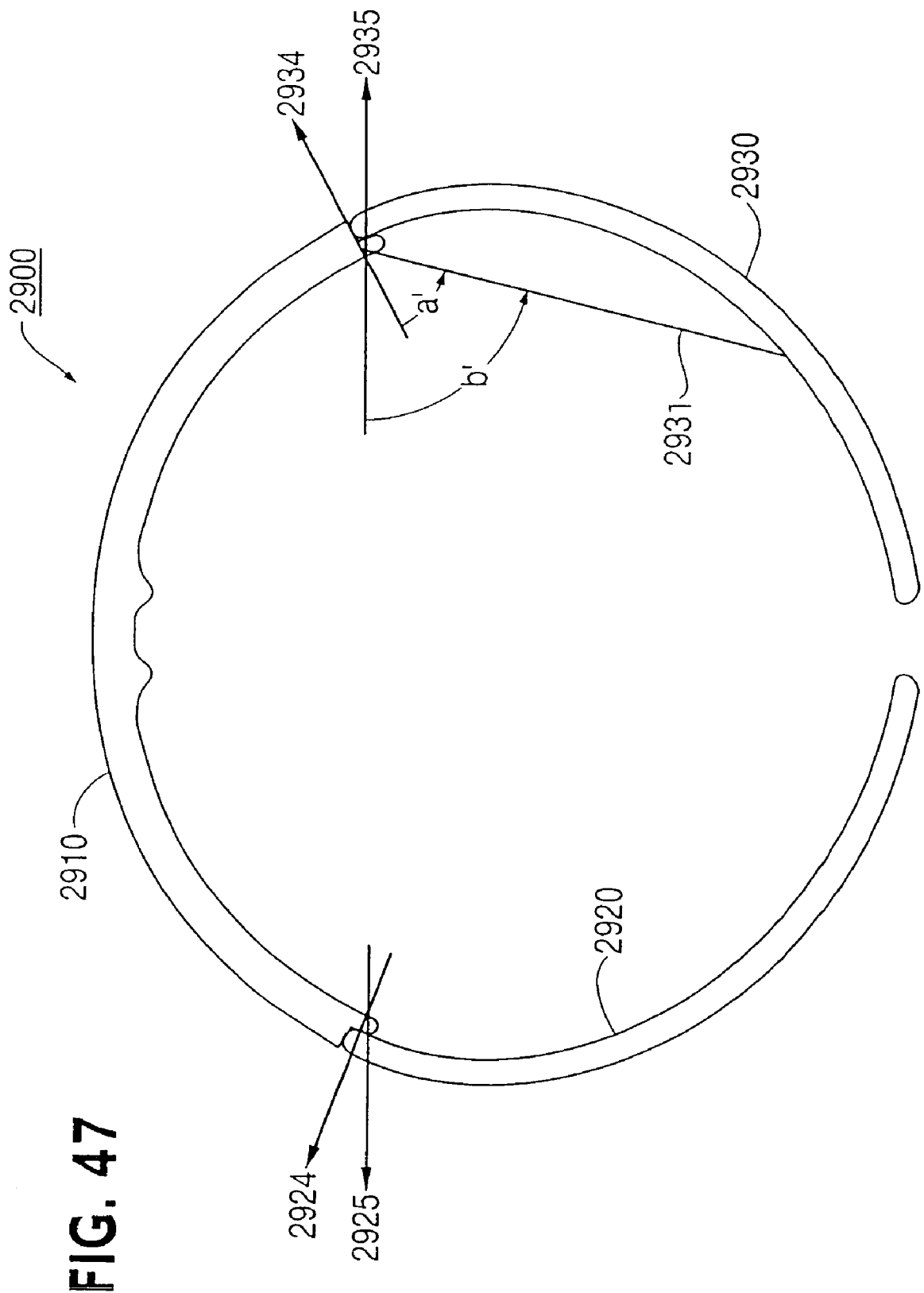
FIG. 47 shows a top view of eyeglasses having pivot axes different from the frame normal, according to another embodiment of the invention.

Although many of the above-described embodiments show the temples being pivotably coupled about a pivot axis that corresponds to a normal axis, other embodiments are possible. For example, where the shape of the temples are not substantially deformable, the temples can have a similar degree of curvature as that of the face. Consequently, as the temples are moved from an unfolded configuration to a folded configuration, the temples can be positioned adjacent to the outer side of the frame without substantially deforming the temples. FIGS. 46 and 47 show example of such embodiments.

FIG. 46 shows a top view of eyeglasses having pivot axes different from the frame normal, according to an embodiment of the invention. Eyeglasses 2800 include a frame 2810, temple 2820 and temple 2830. Temple 2820 is pivotably coupled to frame 2810 about pivot axis 2825. Temple 2830 is pivotably couple to frame 2810 about pivot axis 2835. As shown in FIG. 46, the pivot axes 2825 and 2835 differ from the normal axes 2824 and 2834, respectively, at the corresponding locations of the face 2810. The angle a is defined between the normal axis 2834 and a segment line 2831 from the pivot axis 2835 to a point on the temple 2830. The angle b is defined between the pivot axis 2835 and the segment line 2831. For eyeglasses 2800, the angle a is greater than the angle b. Similar angles exist for temple 2820. Note that temples 2830 and 2820 have a similar degree of curvature as face 2810. Consequently, as the temples 2820 and 2830 are moved from an unfolded configuration to a folded configuration, the temples 2820 and 2830 can be position adjacent to the outer side of the frame 2810 without substantially deforming the temples.

FIG. 47 shows a top view of eyeglasses having pivot axes different from the frame normal, according to another embodiment of the invention. Eyeglasses 2900 include a frame 2910, temple 2920 and temple 2930. Temple 2920 is pivotably coupled to frame 2910 about pivot axis 2925. Temple 2930 is pivotably couple to frame 2910 about pivot axis 2935. As shown in FIG. 46, the pivot axes 2925 and 2935 differ from the normal axes 2924 and 2934, respectively, at the corresponding locations of the face 2910. The angle a' is defined between the normal axis 2934 and a segment line 2931 from the pivot axis 2935 to a point on the temple 2930. The angle b' is defined between the pivot axis 2935 and the segment line 2931. For eyeglasses 2900, the angle a' is less than the angle b'. Similar angles exist for temple 2920. Note that temples 2930 and 2920 have a similar degree of curvature as face 2910. Consequently, as the temples 2920 and 2930 are moved from an unfolded configuration to a folded configuration, the temples 2920 and 2930 can be position adjacent to the outer side of the frame 2910 without substantially deforming the temples.

In alternative embodiments where the temples are deformable, the temples need not have a similar degree of curvature as that of the face. In such embodiments where the angle between the normal axis and the temple is greater than the angle between the pivot axis and the temple, the temples can be deformed to fit around the outer side of the face as the temples are moved from an unfolded configuration to a folded configuration. In such embodiments where the angle between the normal axis and the temple is less than the angle between the pivot axis and the temple, the temples can be deformed outwardly to fit around a user's head when in the unfolded configuration.

Figure 51:
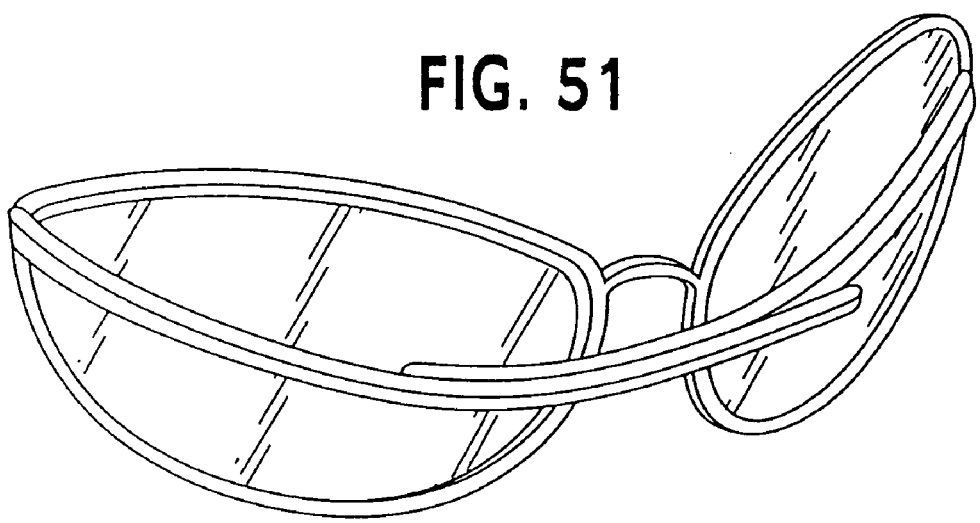
FIG. 51 shows a perspective view of eyeglasses having a wire frame in a folded configuration with overlapping temples.
Figure 52:
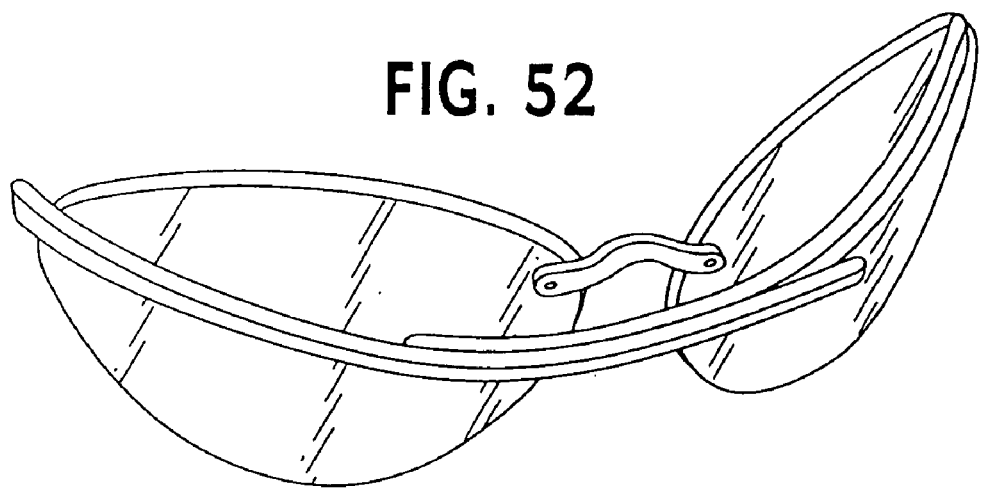
FIG. 52 shows a perspective view of eyeglasses having a nosepiece in a folded configuration with overlapping temples.
Figure 53:
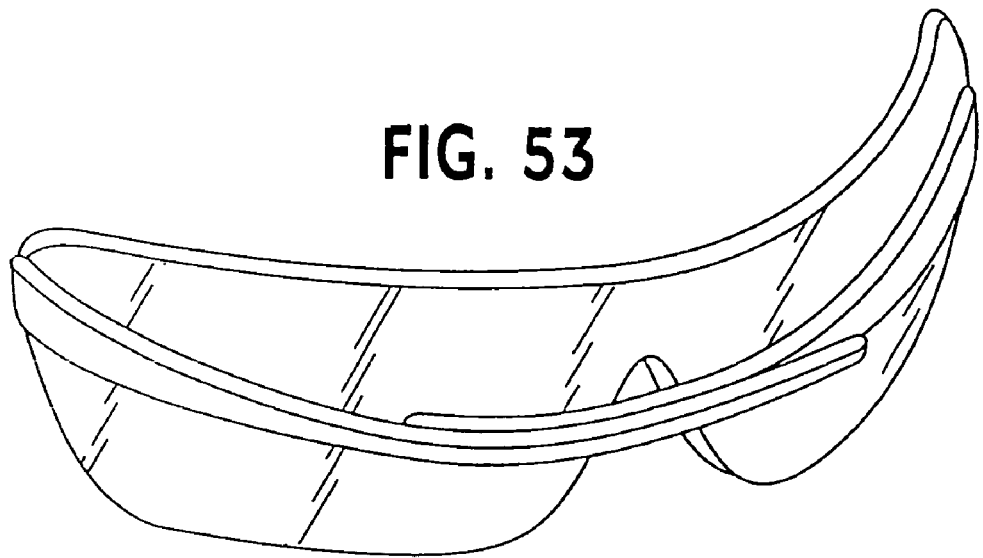
FIG. 53 shows a perspective view of eyeglasses having a shield in a folded configuration with overlapping temples.

FIGS. 51 through 50 show alternative embodiments of eyeglasses having either a wire frame, a nose piece, or a shield in a folded configuration with either overlapping, parallel or crossed temples. More specifically, FIG. 51 shows a perspective view of eyeglasses having a wire frame in a folded configuration with overlapping temples. FIG. 52 shows a perspective view of eyeglasses having a nosepiece in a folded configuration with overlapping temples. FIG. 53 shows a perspective view of eyeglasses having a shield in a folded configuration with overlapping temples.

Figure 54:
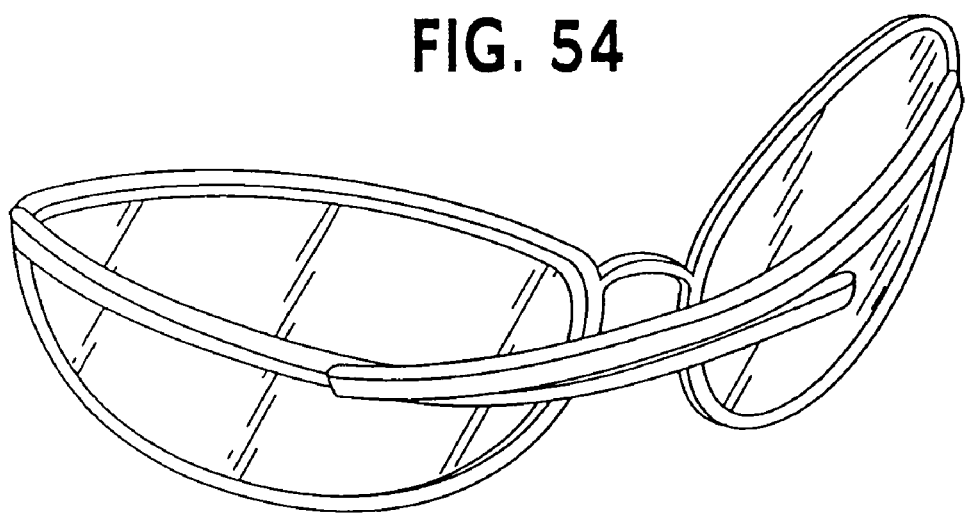
FIG. 54 shows a perspective view of eyeglasses having a wire frame in a folded configuration with parallel temples.
Figure 55:
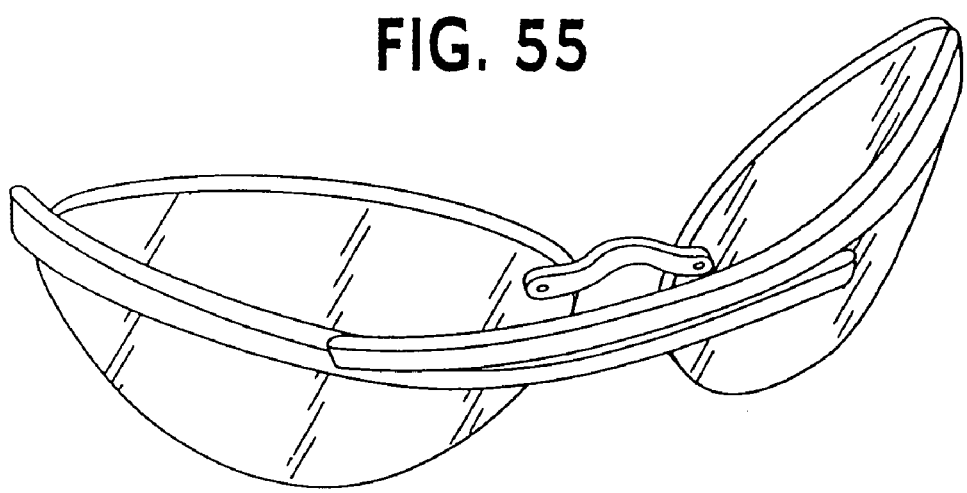
FIG. 55 shows a perspective view of eyeglasses having a nosepiece in a folded configuration with parallel temples.
Figure 56:
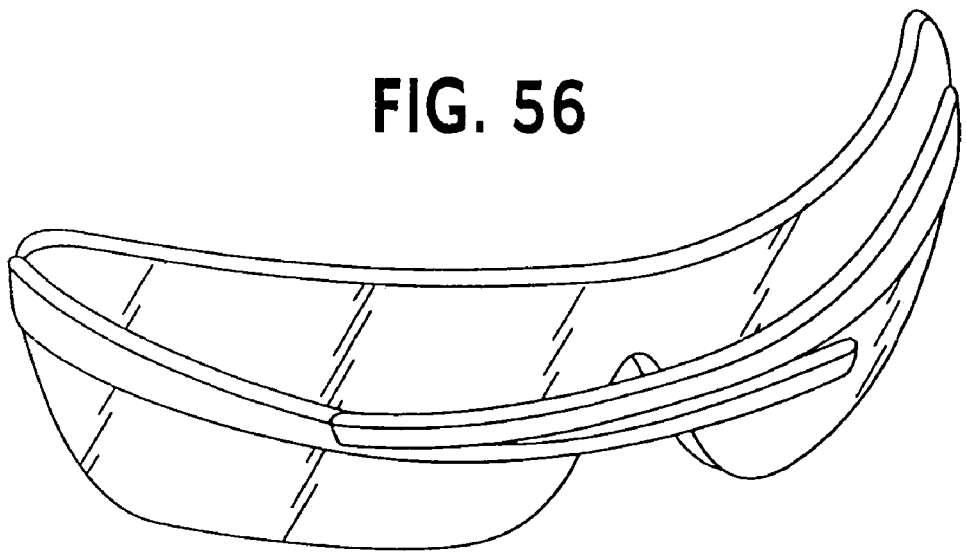
FIG. 56 shows a perspective view of eyeglasses having a shield in a folded configuration with parallel temples.

FIG. 54 shows a perspective view of eyeglasses having a wire frame in a folded configuration with parallel temples. FIG. 55 shows a perspective view of eyeglasses having a nosepiece in a folded configuration with parallel temples. FIG. 56 shows a perspective view of eyeglasses having a shield in a folded configuration with parallel temples.

Figure 57:
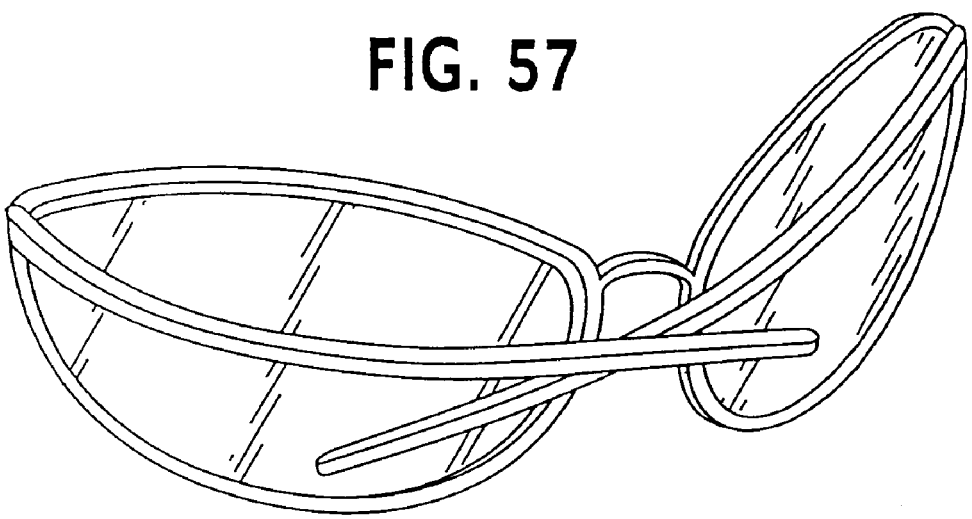
FIG. 57 shows a perspective view of eyeglasses having a wire frame in a folded configuration with crossed temples.
Figure 58:
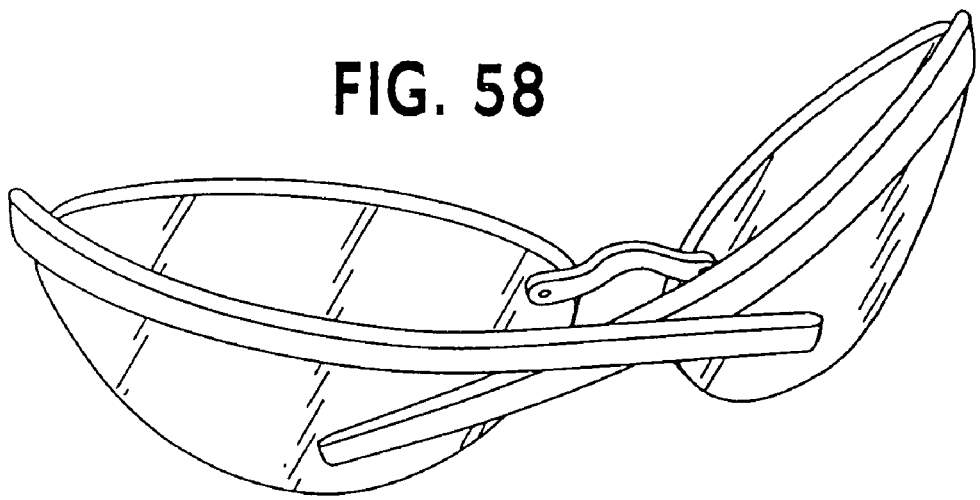
FIG. 58 shows a perspective view of eyeglasses having a nosepiece in a folded configuration with crossed temples.
Figure 59:
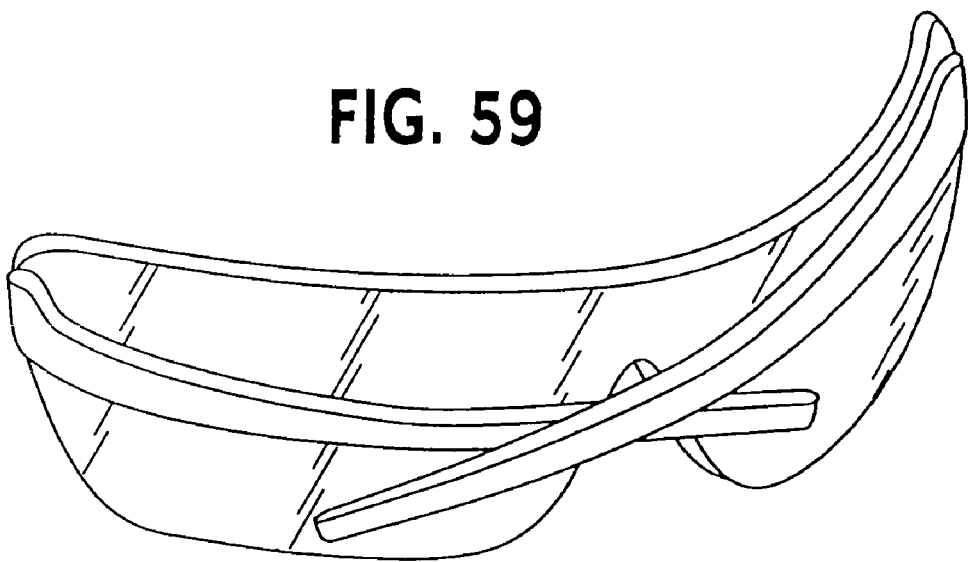
FIG. 59 shows a perspective view of eyeglasses having a shield in a folded configuration with crossed temples

FIG. 57 shows a perspective view of eyeglasses having a wire frame in a folded configuration with crossed temples. FIG. 58 shows a perspective view of eyeglasses having a nosepiece in a folded configuration with crossed temples. FIG. 59 shows a perspective view of eyeglasses having a shield in a folded configuration with crossed temples.

Figure 60:
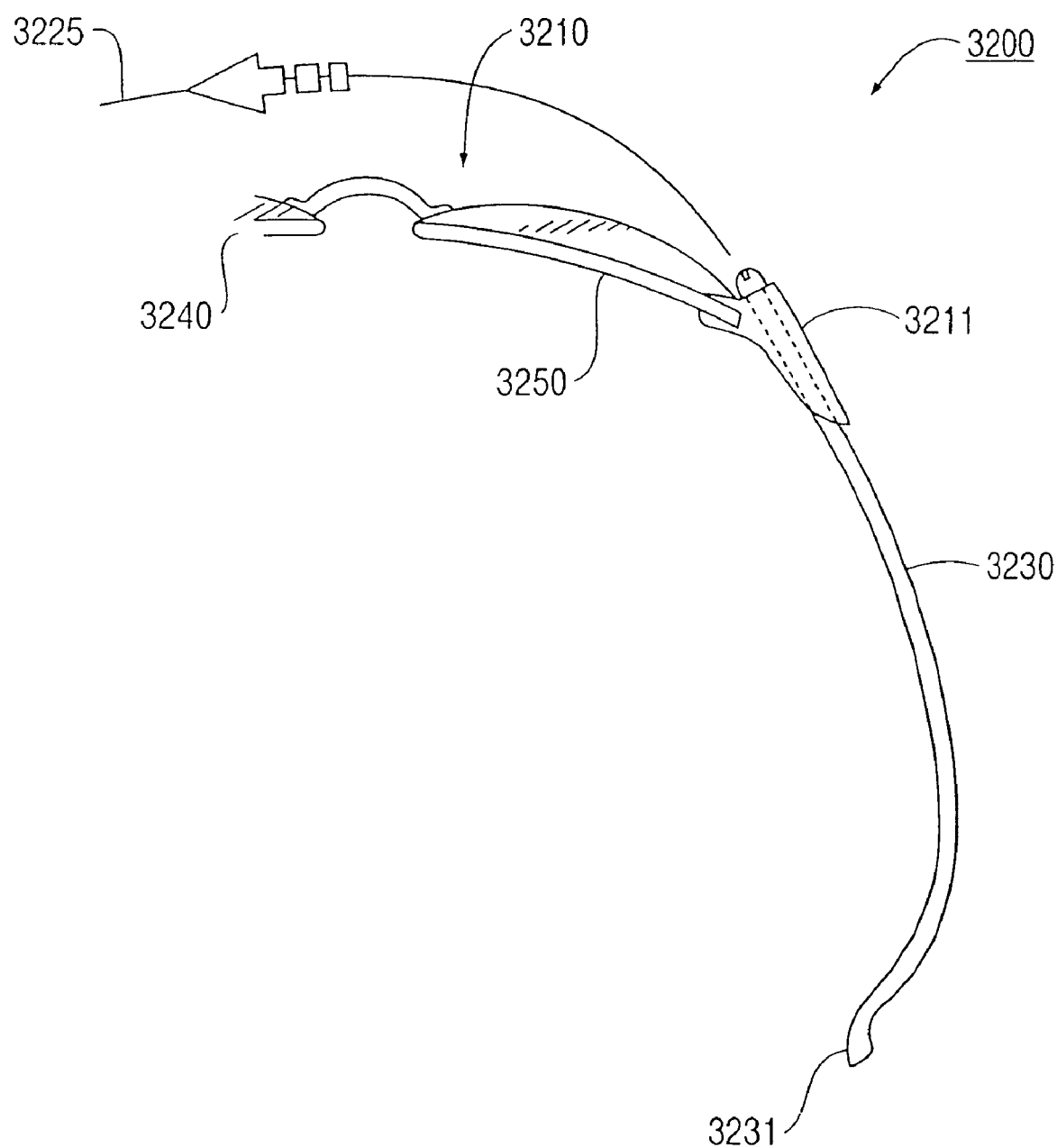
FIGS. 60 and 61 shows a top view and a perspective view, respectively, of a portion of eyeglasses in an unfolded, according to another embodiment of the invention.
Figure 61:
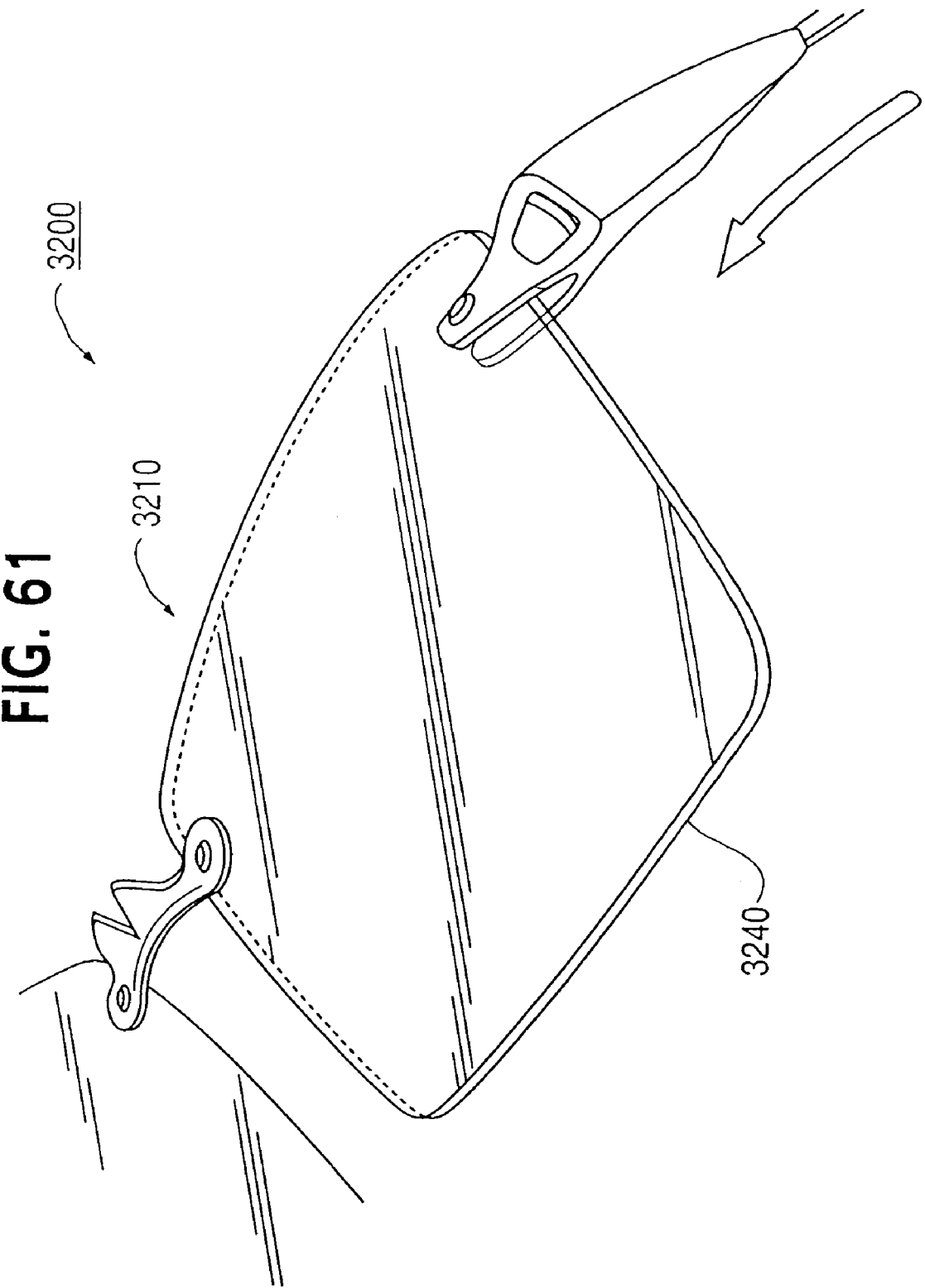

FIGS. 60 and 61 shows a top view and a perspective view, respectively, of a portion of eyeglasses in an unfolded, according to another embodiment of the invention. As shown in FIG. 60, eyeglasses 3200 includes face 3210 and temple 3230. Face 3210 includes lenses 3240 and 3250, and end portion 3211. End portion 3211 includes a channel through which temple 3230 is slidably coupled. Temple 3230 includes a stop portion 3231.

Figure 62:
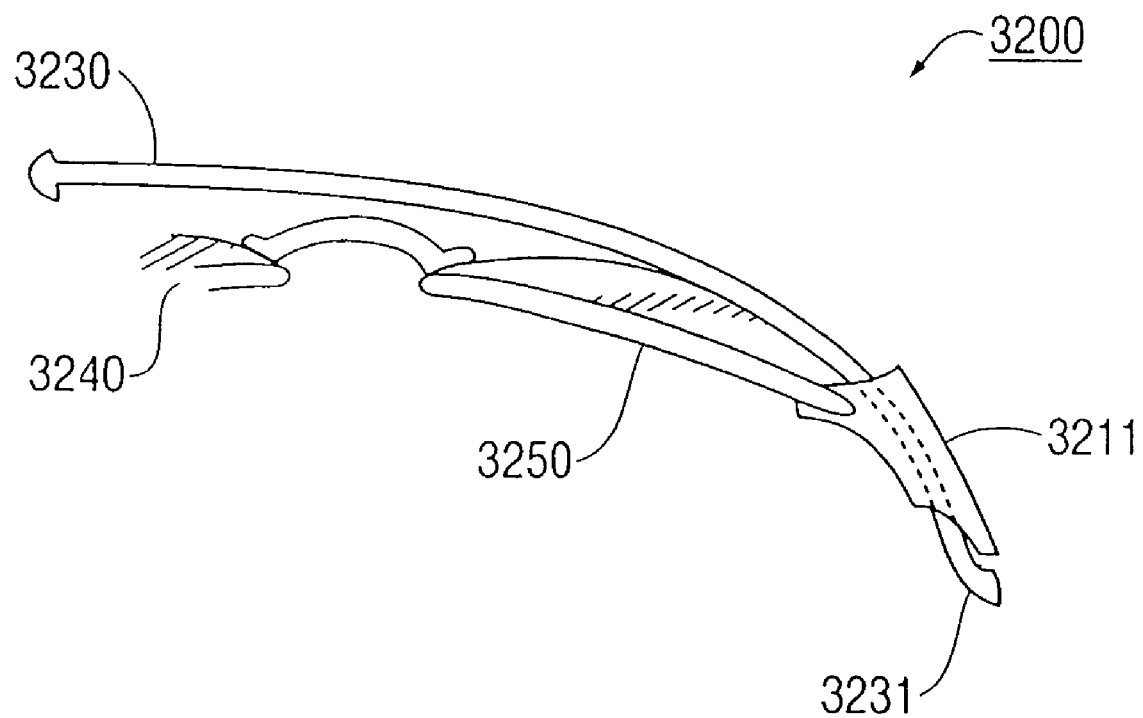
FIG. 62 shows a top view of the eyeglasses shown in FIG. 60 in a folded configuration.

FIG. 62 shows a top view of the eyeglasses shown in FIG. 60 in a folded configuration. Temple 3230 can be slid through the channel of end portion 3211 and along directional line 3225 when being moved from an unfolded configuration to a folded configuration, and vice versa. Temple 3230 can have a frictional fit within the channel of end portion 3211. This friction fit can be overcome so that the temple 3230 can be moved within the channel of end portion 3211. When the temple 3230 is in the folded configuration, the temple is positioned on the outer side of face 110 and adjacent to the lenses 3240 and 3250.

The stop portion 3231 of temple 3230 can have a shape (for example a flared portion) that defines the end at which the temple 3230 can be slide within the channel of end portion 3211. As the eyeglasses 3200 are moved from an unfolded configuration to a folded configuration, the stop portion 3231 stops the movement of temple 3230 within the channel of end portion 3211.

Although the eyeglasses 3200 can show in FIGS. 60 through 62 as rimless glasses, other types of faces (e.g., a shield or wire frame) are possible. For such alternative types of faces, the end portion of the face can be, for example, integrally formed with the face. In addition, many of the various embodiments discussed herein can be combined with a eyeglasses having a temple slidably coupled to a face similar to that described in reference to FIGS. 60 through 62.

Many alternative embodiments are possible that combine various aspects of different eyeglasses designs; in other words, any combination of one or more aspects described below. More specifically, many of the different eyeglasses components discussed herein can be combined to produce various types and styles of eyeglasses. For example, the temples and face can have a uniform or varied relative thickness or thinness to provide for various shapes. The temples, for example, can be straight along its length, or include a bend or curve. The ear portion can be curved, straight, or twisted. The end of the ear portion can terminate in all types of shapes such as a square, circular, or pointed edge. The face can be comprised of a frame that completely encases a lens or lenses or it can simply be attached to a small portion of the lens(es); for example, a face could be comprised of two lenses attached via only a nose bridge. Although the above-described embodiments typically show the temple being attached to the upper portion of the face side, the temples can be attached to the face at any appropriate location, such as for example, at upper, middle or lower portions of the face. The temples and face can be constructed of any appropriate materials such as, for example, metal, wire, rubber or plastic. The temples and face can also be comprised of more than one shape or material in combination. For instance, a temple can be part thick plastic and part thin metal. The eyeglasses can include one or more lenses within the face; the lens(es) can be of any appropriate shape such as for example circular, oval, non-symmetrical oval, triangular, hexagon, octagon, novel shapes (e.g., heart shaped and star shaped), square or rectangular with squared or rounded corners, or any appropriate variation. Embodiments having a single lens are possible where a face is not present and the temples can be attached directly to the lens. The eyeglasses face can be configured with or without nose contact attachments.

While various embodiments of the invention have been described above, it should be understood that they have been presented by way of example only, and not limitation. Thus, the breadth and scope of the present invention should not be limited by any of the above-described embodiments, but should be defined only in accordance with the following claims and their equivalents.

The previous description of the embodiments is provided to enable any person skilled in the art to make or use the invention. While the invention has been particularly shown and described with reference to embodiments thereof, it will be understood by those skilled in the art that various changes in form and details may be made therein without departing from the spirit and scope of the invention.

What is claimed is:

1. An apparatus, comprising:
a face having a first end portion, a second end portion, a first arcuate portion and a second arcuate portion;
a first lens disposed within the face, the first lens having an inner side and an outer side;
a second lens disposed within the face, the second lens having an inner side and an outer side, the inner side of the second lens being on the same side of the face as the inner side of the first lens, the outer side of the second lens being on the same side of the face as the outer side of the first lens;
a first temple coupled to the first end portion of the face, the first temple having an arcuate portion, the first temple being movable between a folded configuration and an unfolded configuration relative to the face, the first temple in its folded configuration being positioned substantially adjacent to the outer side of the first lens and the outer side of the second lens, the arcuate portion of the first temple being positionable substantially adjacent to the first arcuate portion of the face; and
a second temple coupled to the second end portion of the face, the second temple having an arcuate portion, the second temple being movable between a folded configuration and an unfolded configuration relative to the face, the second temple in its folded configuration being positioned substantially adjacent to the outer side of the second lens and the outer side of the first lens, the arcuate portion of the second temple being positionable substantially adjacent to the second arcuate portion of the face.

2. The apparatus of claim 1, wherein:
the arcuate portion of the first temple has its own degree of curvature, and the first arcuate portion of the face has its own degree of curvature, the degree of curvature of the first arcuate portion of the face being different than the degree of curvature of the arcuate portion of the first temple.

3. The apparatus of claim 1, wherein:
the first temple is pivotably coupled to the first end portion of the face.

4. The apparatus of claim 1, wherein:
the first temple is slidably coupled to the first end portion of the face.

5. The apparatus of claim 1, wherein:
the first temple has an interface portion with a concave inner side and a convex outer side, the second temple has an interface portion with a concave inner side and a convex outer side, the first temple interface portion and the second temple interface portion being substantially parallel and overlapping when the first temple and the second temple are in their folded configurations.

6. The apparatus of claim 1, wherein:
the first temple has a portion substantially parallel with a portion of the second temple when the first temple and the second temple are in their folded configurations.

7. The apparatus of claim 1, wherein:
the first temple has an interface portion, the second temple has an interface portion, and the first temple interface portion has a portion that crosses over a portion of the second temple interface portion when the first temple and the second temple are in their folded configurations.

8. A method for moving an apparatus between a folded configuration and an unfolded configuration, the apparatus including a face, a first lens, a second lens, a first temple and a second temple, the face having a first arcuate portion, a second arcuate portion, a first end portion and a second end portion, the first lens and the second lens being disposed within the face and each having an inner side, an outer side and a center portion, the first temple having an arcuate portion and being pivotably coupled to the first end portion of the face, the second temple having an arcuate portion and being pivotable coupled to the second end portion of the face, the method comprising:
pivoting the first temple about the first end portion of the face from an unfolded configuration to a folded configuration;
positioning the first temple so that the first temple is disposed substantially adjacent to the outer side of the first lens and the outer side of the second lens and the arcuate portion of the first temple is disposed substantially adjacent to the first arcuate portion of the face;
pivoting the second temple about the second end portion of the face from an unfolded configuration to a folded configuration; and
positioning the second temple so that the second temple is disposed substantially adjacent to the outer side of the second lens and the outer side of the first lens and the arcuate portion of the second temple is disposed substantially adjacent to the second arcuate portion of the face.

9. The method of claim 8, wherein:
the first arcuate portion of the face has its own degree of curvature, the arcuate portion of the first temple has its own degree of curvature, the degree of curvature of the first arcuate portion of the face being different than the degree of curvature of the arcuate portion of the first temple.

10. The method of claim 9, wherein:
the first temple is movable from the unfolded configuration to the folded configuration without substantially deforming the first temple.

11. The method of claim 9, wherein:
the positioning the second temple includes positioning the second temple proximate to the first temple.

12. The method of claim 9, wherein:
the positioning the first temple includes positioning the first temple so that the first temple extends across the first lens and to the center portion of the second lens; and
the positioning the second temple includes positioning the second temple so that the second temple extends across the second lens and to the center portion of the first lens.

13. An apparatus, comprising:
a face having a first portion and a second portion, the first portion of the face being arcuate;
a lens disposed within the face, the lens including a first lens portion and a second lens portion, the first lens portion having an inner side and an outer side, the second lens portion having an inner side and an outer side, the outer side of the first lens portion being on the same side of the face as the outer side of the second lens portion; and
a temple coupled to the first portion of the face, the temple including an arcuate portion, the temple being movable between a folded configuration and an unfolded configuration,
the outer side of the first lens portion having a center point and a center region centered around the center point, the outer side of the second lens portion having a center point and a center region centered around its center point, and while the temple is in its folded configuration, at least a portion of the center region of the first lens portion is disposed between a portion of the inner side of the first lens portion and a portion of the temple and at least a portion of the center region of the second lens portion is disposed between a portion of the inner side of the second lens portion and a portion of the temple, the temple being substantially adjacent to the outer side of the first lens portion and the outer side of the second lens portion in the folded configuration.

14. The apparatus of claim 13, wherein:
the arcuate portion of the temple is disposed substantially adjacent to the arcuate first portion of the face when the temple is in its folded configuration.

15. An apparatus, comprising:
a face having a first portion and a second portion, the first portion of the face being arcuate;
a first lens disposed within the face, the first lens having an inner side and an outer side;
a second lens disposed within the face, the second lens having an inner side and an outer side, the outer side of the first lens being on the same side of the face as the outer side of the second lens;

a first temple coupled to the first portion of the face, the first temple including an arcuate portion and being movable between a folded configuration and an unfolded configuration; and a second temple coupled to the second portion of the face, the second temple including an arcuate portion and being movable between a folded configuration and an unfolded configuration, the first temple in its folded configuration being disposed substantially adjacent to and extending along the outer side of the first lens and a substantial portion of the outer side of the second lens, the second temple in its folded configuration being disposed substantially adjacent to and extending along the outer side of the second lens and a substantial portion of the outer side of the first lens.

16. The apparatus of claim 15, wherein:

the arcuate portion of the first temple and the arcuate portion of the second temple being disposed substantially adjacent to the face when the first temple and the second temple are in their folded configurations.

17. The apparatus of claim 15, wherein:

the temple is pivotably coupled to the first end portion of the face.

* * * * *